United States Patent
Waters, Jr. et al.

(10) Patent No.: US 10,435,910 B2
(45) Date of Patent: *Oct. 8, 2019

(54) FLOOD PROTECTION FOR UNDERGROUND AIR VENTS

(71) Applicant: Floodbreak, L.L.C., Houston, TX (US)

(72) Inventors: Louis A. Waters, Jr., Bellaire, TX (US); Nick Adam Eastman, Georgetown, TX (US)

(73) Assignee: Floodbreak, L.L.C., Bellaire, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/650,557

(22) Filed: Jul. 14, 2017

(65) Prior Publication Data

US 2017/0314810 A1 Nov. 2, 2017

Related U.S. Application Data

(63) Continuation-in-part of application No. 14/506,778, filed on Oct. 6, 2014, now Pat. No. 9,752,342.

(Continued)

(51) Int. Cl.
*E04H 9/14* (2006.01)
*E21F 1/08* (2006.01)
(Continued)

(52) U.S. Cl.
CPC ............. *E04H 9/145* (2013.01); *E02D 19/02* (2013.01); *E06B 7/02* (2013.01); *E06B 7/14* (2013.01);
(Continued)

(58) Field of Classification Search
CPC ...... E04H 9/145; E05Y 2800/428; E21F 1/08; E21F 1/16; E21F 17/103; E21F 17/12; E02D 19/02
See application file for complete search history.

(56) References Cited

U.S. PATENT DOCUMENTS 231,544 A 8/1880 Darst
930,829 A 8/1909 Bolling
(Continued)

FOREIGN PATENT DOCUMENTS

CN 201962783 9/2011
CN 102392686 3/2012
(Continued)

OTHER PUBLICATIONS

Search History PCT/US2017/042237.
(Continued)

*Primary Examiner* — Catherine A Kelly
(74) *Attorney, Agent, or Firm* — Tim L. Burgess, P.C.

(57) ABSTRACT

Apparatus allowing ventilation through a ventilation shaft to an underground ventilation duct fluidly communicating through the ventilation shaft to an atmospheric opening of the shaft and on threat of flooding operable to prevent downward flow of surface water into the underground ventilation duct includes support sidewalls fitting in the shaft providing a ventilation passage between support top and bottom openings and a suspension member supported on opposed lateral sidewalls unobstructively horizontally spanning the passage proximate the top opening and holding one or more hinge connected panels in the passage that manually release to rotationally close the passage and prevent flooding and are manually rotationally liftable to a home position allowing ventilation. The suspension member is liftingly removable from the support and may include end keys received in keyed supports to allow the suspension member to fit in the supports so a specific panel closes to a specific sidewall.

20 Claims, 16 Drawing Sheets

Related U.S. Application Data

(60) Provisional application No. 61/887,416, filed on Oct. 6, 2013, provisional application No. 62/363,024, filed on Jul. 15, 2016.

(51) Int. Cl.

| | | |
|---|---|---|
| *E02D 19/02* | (2006.01) | |
| *E06B 7/02* | (2006.01) | |
| *E06B 7/14* | (2006.01) | |
| *E06B 9/04* | (2006.01) | |
| *E05F 1/02* | (2006.01) | |
| *E06B 9/00* | (2006.01) | |

(52) U.S. Cl.
CPC ................ *E06B 9/04* (2013.01); *E21F 1/08* (2013.01); *E05F 1/02* (2013.01); *E05Y 2800/11* (2013.01); *E05Y 2800/252* (2013.01); *E05Y 2800/428* (2013.01); *E06B 2009/007* (2013.01); *Y02A 50/14* (2018.01)

(56) References Cited

U.S. PATENT DOCUMENTS

| | | | | |
|---|---|---|---|---|
| 1,556,328 | A * | 10/1925 | Hutchins | E02B 13/00 160/85 |
| 1,715,903 | A | 12/1925 | Dame | |
| 2,586,967 | A | 2/1952 | Lundy | |
| 2,741,972 | A | 4/1956 | Pryne | |
| 4,073,147 | A | 2/1978 | Nomura | |
| 4,474,167 | A | 10/1984 | McCabe | |
| 4,503,881 | A * | 3/1985 | Vecchio | E03F 7/04 137/425 |
| 5,201,685 | A * | 4/1993 | Raisanen | A01K 1/0058 454/259 |
| 5,711,343 | A | 1/1998 | Beckett | |
| 5,924,922 | A * | 7/1999 | Eakin | A01K 1/0058 454/256 |
| 5,980,381 | A | 11/1999 | McCormick | |
| 6,287,050 | B1 | 9/2001 | Montgomery et al. | |
| 6,533,656 | B2 * | 3/2003 | Hertel | F24F 13/1406 454/259 |
| 6,623,209 | B1 | 9/2003 | Waters, Jr. | |
| 6,685,557 | B1 * | 2/2004 | Hoffe | F24F 13/06 137/527.8 |
| 7,101,114 | B1 | 9/2006 | Waters, Jr. | |
| 7,435,035 | B2 | 10/2008 | Cullen | |
| 7,467,911 | B2 | 12/2008 | Flury | |
| 7,600,944 | B1 * | 10/2009 | Keating | E04H 9/145 405/96 |
| 7,814,705 | B2 * | 10/2010 | Reed | E06B 9/04 49/31 |
| 7,926,539 | B1 | 4/2011 | Hurst | |
| 7,972,081 | B2 * | 7/2011 | Linares | E02B 3/104 405/105 |
| 8,033,753 | B2 * | 10/2011 | Waters, Jr. | E21F 1/08 405/96 |
| 9,004,814 | B2 * | 4/2015 | Petrillo | F24F 13/14 137/403 |
| 9,267,252 | B1 | 2/2016 | Adler et al. | |
| 9,279,224 | B2 * | 3/2016 | Waters, Jr. | E02B 3/104 |
| 9,303,423 | B2 * | 4/2016 | Cadogan | E06B 9/13 |
| 9,315,965 | B1 * | 4/2016 | Adler | E04H 9/14 |
| 9,752,342 | B2 * | 9/2017 | Waters, Jr. | E05F 1/02 |
| 10,106,945 | B2 * | 10/2018 | Waters, Jr. | F24F 11/89 |
| 2002/0021941 | A1 | 2/2002 | Montgomery et al. | |
| 2008/0014021 | A1 | 1/2008 | Flury | |
| 2008/0016780 | A1 | 1/2008 | McDougle et al. | |
| 2009/0185864 | A1 * | 7/2009 | Waters, Jr. | E21F 1/08 405/96 |
| 2009/0189404 | A1 | 7/2009 | Anderson | |
| 2011/0154563 | A1 | 6/2011 | Ball | |
| 2013/0209173 | A1 | 8/2013 | Quek | |
| 2014/0241804 | A1 | 8/2014 | Petrillo | |
| 2014/0242902 | A1 * | 8/2014 | Ali | F24F 13/14 454/359 |
| 2015/0133042 | A1 * | 5/2015 | Pearce | F24F 13/08 454/184 |
| 2016/0097212 | A1 | 4/2016 | Waters, Jr. | |
| 2018/0128002 | A1 * | 5/2018 | Quek | E04H 9/145 |

FOREIGN PATENT DOCUMENTS

| | | |
|---|---|---|
| EP | 2314356 | 4/2011 |
| JP | H04266037 | 2/1987 |
| JP | H10140592 | 5/1998 |
| JP | 2008133708 | 6/2008 |
| JP | 2005061201 | 3/2009 |
| JP | 4873498 | 2/2010 |
| KR | 200192098 | 8/2000 |
| KR | 2020020013062 | 4/2002 |
| KR | 200280864 | 6/2002 |
| KR | 1020100074363 | 7/2010 |
| KR | 20100123473 | 11/2010 |

OTHER PUBLICATIONS

International Search Report PCT/US2017/042237.
Written Opinion of the International Searching Authority PCT/US2017/042237.
Translation of EP2314356, Schwenzer, Apr. 27, 2011.
Translation of JP2008133708A, Sadahito, Jun. 12, 2008.
Translation of JPH10140592A, Kazuo, May 26, 1998.
Translation of JP4873498B2, Ito, Feb. 18, 2010.
Translation of KR200192098, Byum, Aug. 16, 2000.
Translation of CN201962783, Lin, Sep. 7, 2011.
Translation of KR2020020013062, Jeon, Apr. 29, 2002.
Translation of CN 102392686, Guisheng, Mar. 28, 2012.
Translation of KR200280864, Chung, Jul. 6, 2002.
Translation of JPH04026037, Masuda, Feb. 3, 1987.
Translation of KR1020080132763, Choi, Jul. 2, 2010.
Viking-F-1-Dry-Valve-Data-Sheet, The Viking Corporation, Mar. 28, 2013.
Round Backdraft Dampers Now Available from Greenheck, Greenheck, May 26, 2018.
Fire Dampers Type: Butterfly 60min, (published prior to Aug. 17, 2016).

* cited by examiner

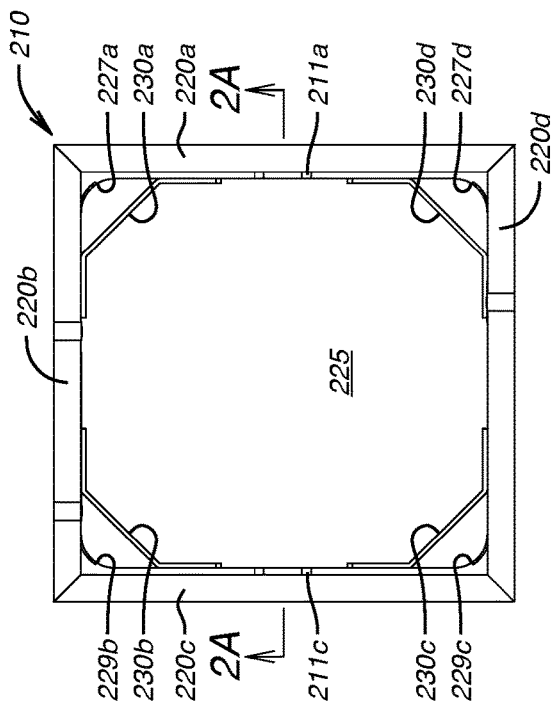
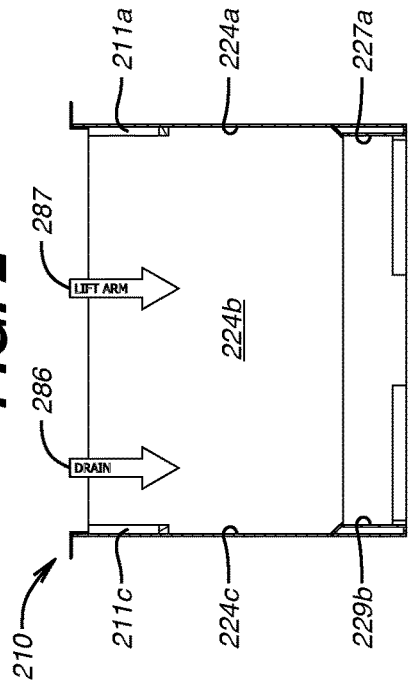
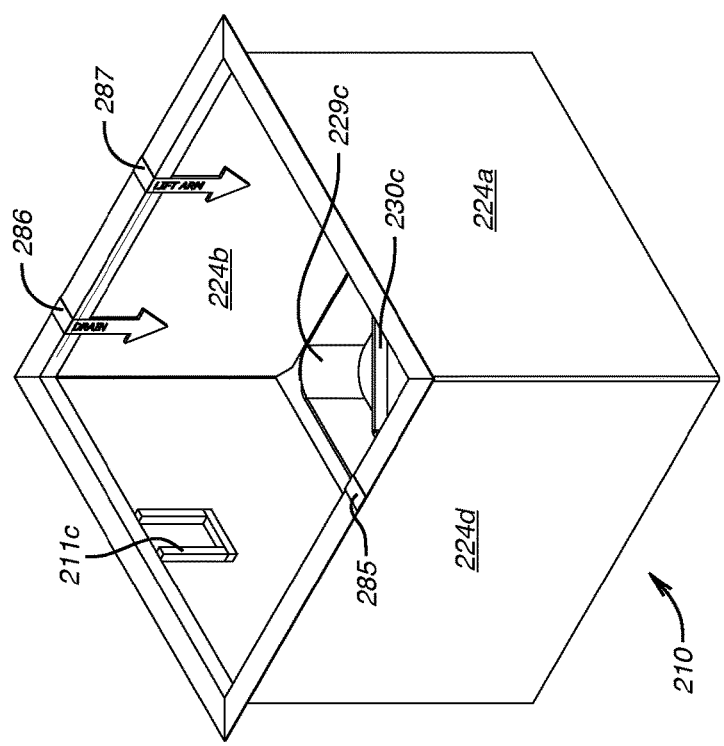
FIG. 2
FIG. 2A
FIG. 1

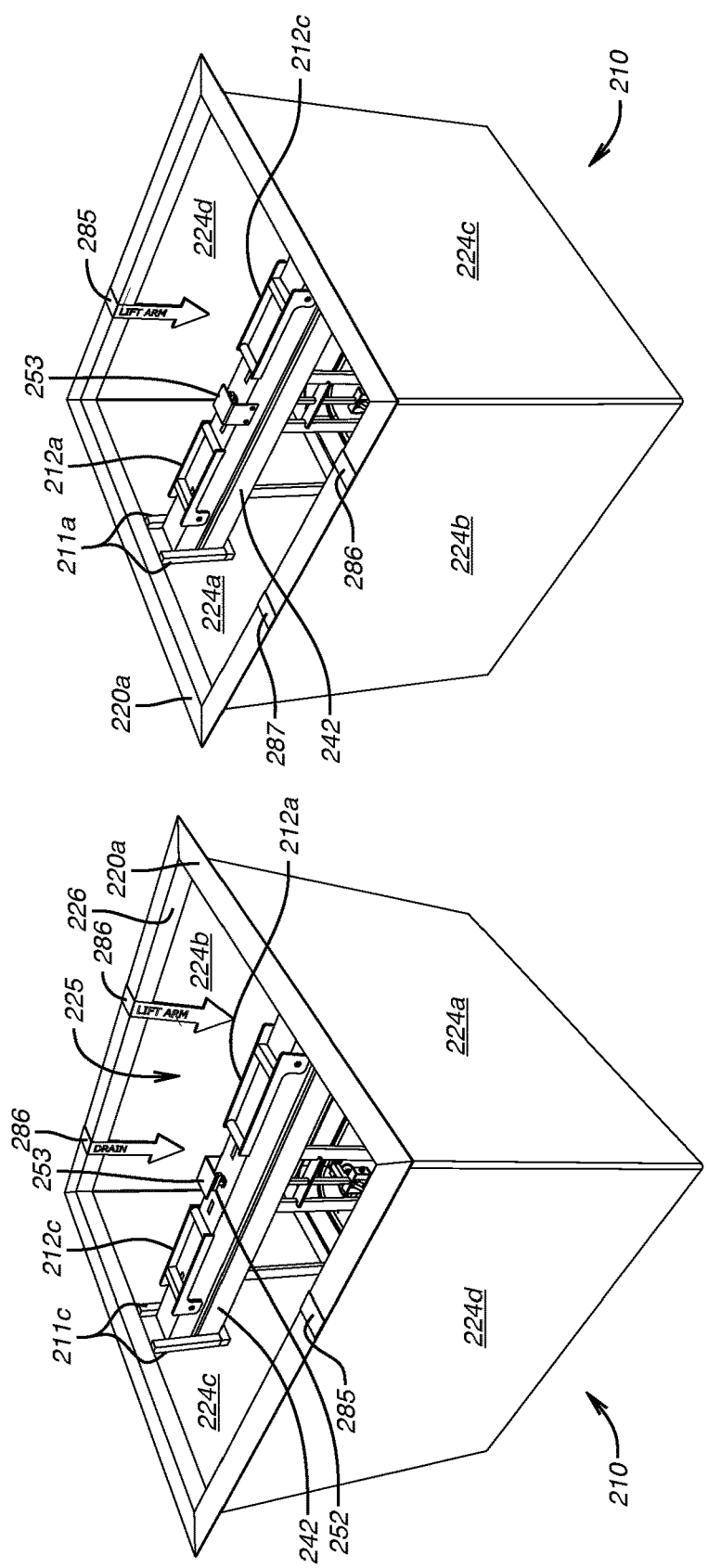

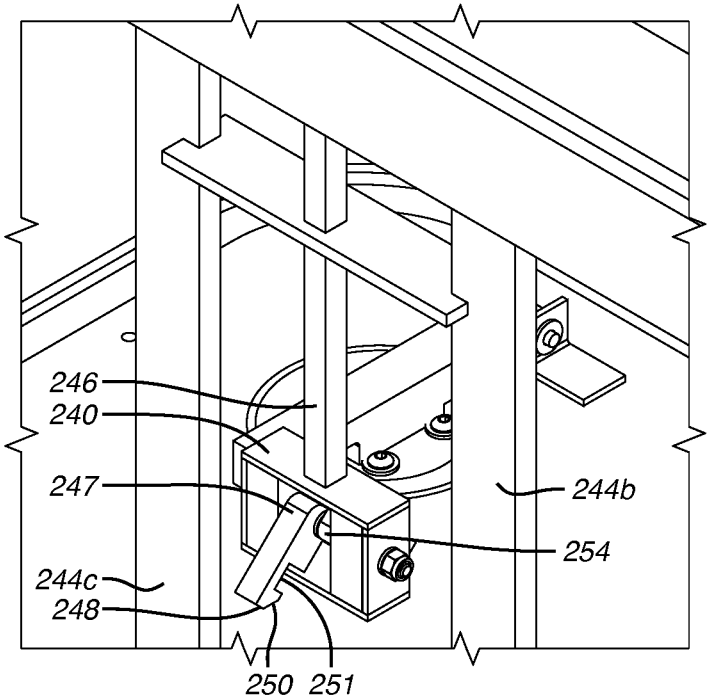
FIG. 6
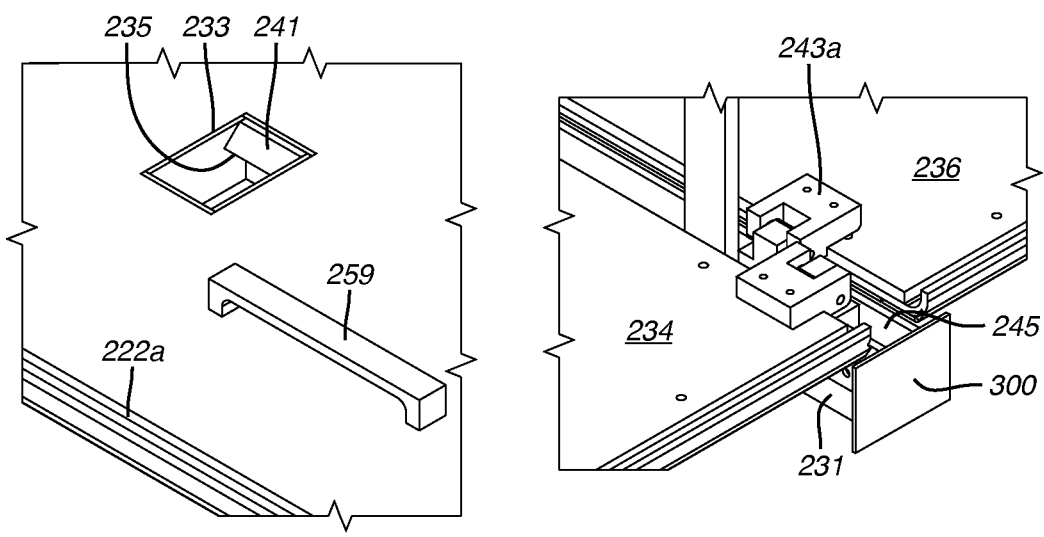
FIG. 7
FIG. 8

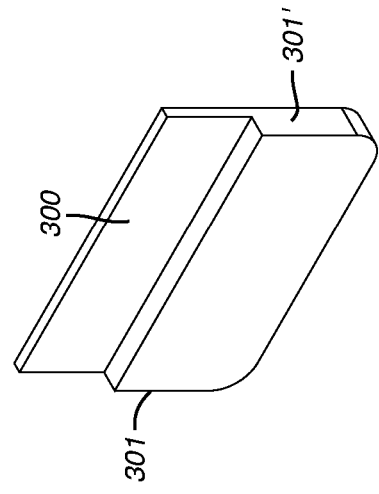
*FIG. 24*
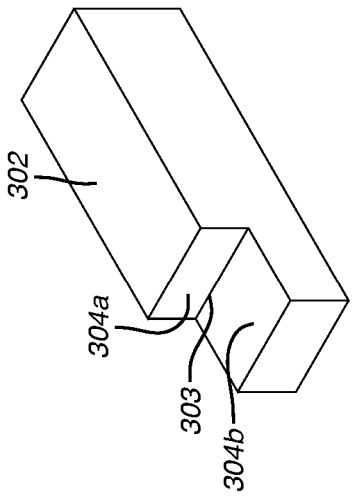
*FIG. 27*
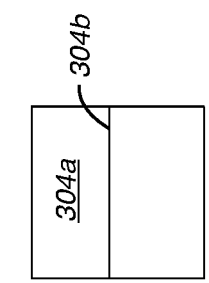
*FIG. 23*
*FIG. 26*
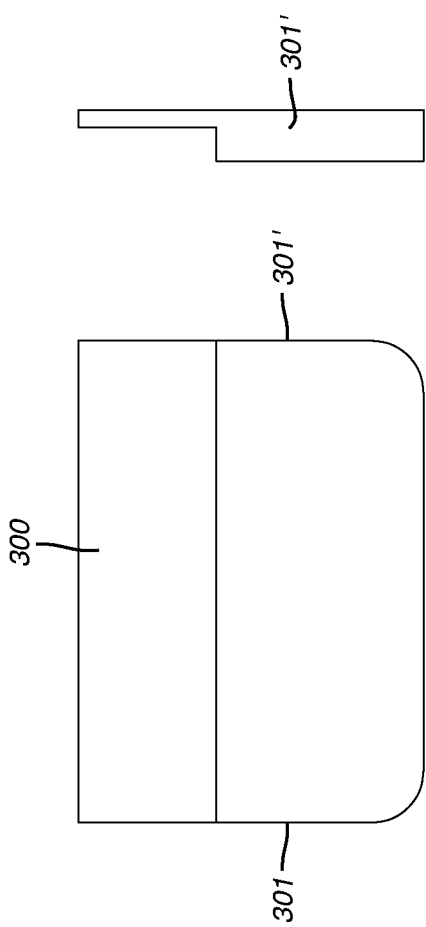
*FIG. 22*
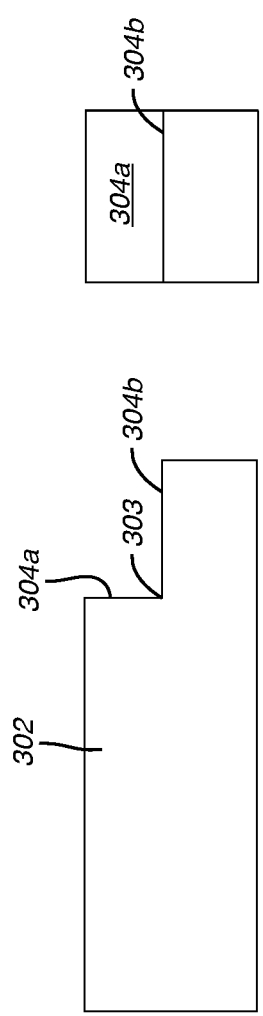
*FIG. 25*

FLOOD PROTECTION FOR UNDERGROUND AIR VENTS

CROSS REFERENCE TO RELATED APPLICATIONS

This application is a continuation-in-part of and claims the benefit of U.S. application Ser. No. 14/506,778 filed Oct. 6, 2014, which claimed the benefit of U.S. Provisional Application No. 61/887,416, filed Oct. 6, 2013, as does this application, and further claims the benefit of U.S. Provisional Application No. 62/363,024, filed Jul. 15, 2016, the disclosures of all of which are incorporated herein by reference.

STATEMENT REGARDING FEDERALLY SPONSORED RESEARCH AND DEVELOPMENT

Not applicable

BACKGROUND OF THE DISCLOSURE

Technical Field

This invention relates to blocking flooding water from entering underground ventilation passages.

Background Art

Surface storm waters entering and flooding underground tunnels and chambers through ventilation ducts connecting the underground chambers or tunnels to air at ground surface affect without limitation, underground transportation tunnels for road vehicles, trains, and subways, and underground chambers, such as associated with a complex of connecting tunnels and shafts, for example as used for such things as underground hydroelectric-power plants, or with underground utilities which require ventilation, such as underground transformer rooms.

In a typical subway ventilation arrangement, ventilation ducts or shafts are incorporated into subway systems near stations to exhaust stale pushed air as the train nears a station and to pull in fresh outside air as a train leaves a station, Also reducing the "piston effect" of air being forced through the tunnels at high speeds by moving trains. Typically, a ventilation duct communicates from an underground tunnel and terminates in a ventilation shaft structure below grade level that opens to the atmosphere at grade level such as a sidewalk where the opening is covered by a subway grating.

Subways have systems for handling water. When it rains, water runs down stairwells, onto platforms and thence onto tracks, and some gets in the ventilation systems through the surface gratings. Drains beneath the tracks pipe water to underground sumps in pump rooms next to the subway tracks. Pumps pull the water up to pressure relief manholes open to the atmosphere at street level; from there the water drains under gravity flow into city storm sewers. The problem is that in heavy rains, storm sewers are overwhelmed and flush water back into the streets, flooding the streets with water inundates sidewalk and pours down through subway gratings into the ventilation system thence into the tunnels and onto the tracks. The pumping system can only return water to the flooded street; from there the water reenters the flood pool pouring into the ventilation system, defeating the pumping system as a means of controlling subway flooding. The problem is especially acute in cities like New York and Lower Manhattan, which is low-lying, vulnerable to storm surges and dotted with grade-level gratings, stairwells and other points of entry for running water into the subways.

One solution for reducing entrance of runoff water from sidewalk grating openings through the ventilation ducts down into the underground systems was raising the subway ventilation gratings above sidewalk level, as was done in some locations in New York City in Manhattan, Queens and Brooklyn after flooding from a severe rainstorm in 2007. This not only was costly to implement but also sacrificed much of the available sidewalk area available for pedestrians. In advance of the super storm Sandy in 2013, when predicted storm surge and high tides in addition to heavy rains signaled flooding of subways, workers resorted to sandbags and fastening plywood covers over subway ventilation gratings to try to prevent flooding. Sandy was testament to flood hazards of subways and vented subterranean structures. Fastening plywood covers over large numbers of air vent gratings in a short period of time as a solution is an imperfect labor and materials intensive process and can be too little too late, as was made clear by subway flooding from Sandy. A simpler, faster, relatively inexpensive and more effective method of preventing flooding through sidewalk air vent gratings is needed.

DESCRIPTION OF DRAWINGS

FIG. 1 is an isometric view of a quadrilateral (four sided) support structure for receiving the embodiment of FIG. 5

FIG. 2 is a top plan view of the quadrilateral embodiment of FIG. 1.

FIG. 2A is a cross section view of the quadrilateral embodiment of FIG. 1 taken along the lines 2A-2A of FIG. 2.

FIG. 3 is an isometric view of the panel assembly of FIG. 5 received in the quadrilateral support of FIGS. 1, 2 and 2A viewed in this perspective from a left side.

FIG. 4 is an isometric view of the panel assembly of FIG. 5 received in the quadrilateral support of FIGS. 1, 2 and 2A rotated 180 degrees from the view of FIG. 3, that is, it is a view of the opposite side of FIG. 3 (the right side).

FIG. 6 is an enlargement of the portion of FIG. 5 shown in dashed lines indicated by the reference numeral 6.

FIG. 7 is an enlargement of the portion of FIG. 5 shown in dashed lines indicated by the reference numeral 7.

FIG. 8 is an enlargement of the portion of FIG. 5 shown in dashed lines indicated by the reference numeral 8.

FIG. 22 is a front elevation of a lower connector plate for the variant assembly of FIG. 5.

FIG. 23 is a side elevation view of the connector plate of FIG. 22.

FIG. 24 is a perspective view of the connector plate of FIG. 22.

FIG. 25 is a front elevation of an anchor bar for the variant assembly of FIG. 5

FIG. 26 is a side elevation view of the anchor bar of FIG. 25.

FIG. 27 is a perspective view of the anchor bar of FIG. 25

DESCRIPTION OF EMBODIMENTS

Figure 5:
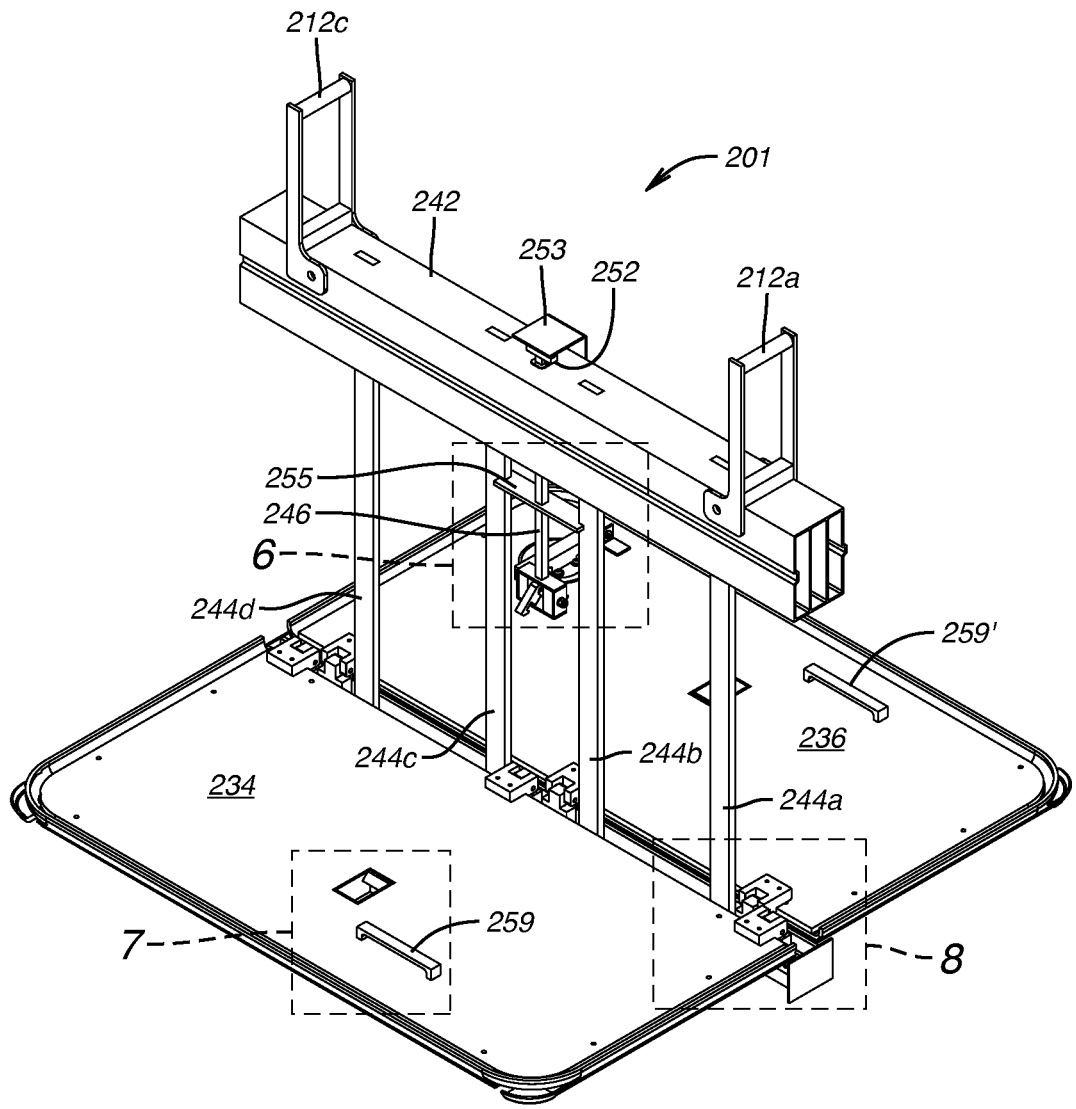
FIG. 5 is an isometric top view of a liftingly removable panel assembly with panels in lowered position.

In accordance with this invention apparatus for installation in a ventilation shaft already fluidly communicating between an atmospheric opening and an underground ventilation duct allows the ventilation when there is no treat of flooding and on threat of flooding is manually operable to close ventilation from the atmospheric opening and prevent downward flow into the underground ventilation duct of surface water entering the atmospheric opening.

The concepts embodied in the exemplary embodiments of such apparatus described herein have application to any system in which an atmospheric opening communicates with a ventilation duct for an underground chamber or tunnel or other underground structure requiring ventilation, and through which opening substantial volumes of water can enter, whether by heavy rain or by storm surge propelled by hurricane or tropical storm or otherwise.

In the descriptions of exemplary embodiments of the invention that follow, reference is made to the accompanying drawings, which form a part hereof and in which are shown, by way of illustration, specific embodiments in which the invention may be practiced. Specific details disclosed herein are in every case a non-limiting embodiment representing concrete ways in which the concepts of the invention may be practiced. This serves to teach one skilled in the art to employ the present invention in virtually any appropriately detailed system, structure or manner consistent with those concepts. It will be seen that various changes and alternatives to the specific described embodiments and the details of those embodiments may be made within the scope of the invention. Because many varying and different embodiments may be made within the scope of the inventive concepts herein described and in the specific embodiments herein detailed, it is to be understood that the details herein are to be interpreted as illustrative and not as limiting.

The various directions such as "upper," "lower," "bottom," "top," "transverse", "perpendicular", "vertical", "horizontal," and so forth used in the detailed description of embodiments are made only with respect to easier explanation in conjunction with the drawings. The components may be oriented differently while performing the same function and accomplishing the same result as the embodiments herein detailed embody the concepts of the invention, and such terminologies are not to be understood as limiting the concepts which the embodiments exemplify.

The term "perpendicular" means substantially at a right angle to a reference to a degree that if not absolutely a right angle will not materially adversely affect the arrangement and function of the element described as perpendicular. The terms "vertical" or "vertically" include but are not limited to literal vertical and generally mean oriented up and down with respect to the earth's horizon to a degree that if not absolutely vertical will not materially adversely affect the function of the element described as vertical. Similarly, the terms "horizontal" or "horizontally" include but are not limited to literal horizontal and generally mean not out of level with respect to the earth's horizon to a degree that will materially adversely affect the function of the element described as horizontal.

As used herein, the use of the word "a" or "an" when used in conjunction with the term "comprising" (or the synonymous "having" or "including") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

For components of described embodiments that are the same, in some cases the first mentioned component is identified by a given reference numeral, and the second such component is the same reference number marked with an apostrophe, for example "panel handle 259" identifies a first mentioned component, and the second such like component is identified as "panel handle 259'". Coupling the two reference numerals separated by a coma, for example "panel handles 259, 259'" means either component "panel handle 259" or "panel handle 259'" is being described unless the context means both are being described together.

For illustrative purposes of an application of the concepts herein disclosed for blocking entrance of water into a ventilation duct, the embodied concepts are described in reference to a specific ventilation environment. The exemplary application is for a subway system. In the specific embodiments described herein as examples, it is assumed the atmospheric opening through which flooding waters enter has a rectilinear shape, as for grating covered grade level sidewalk openings for subway ventilation systems, which at least in New York City typically are rectangular. Although the detailed descriptions of specific embodiments relate to a rectilinear shape and for a particular environment, the invention does not require that the opening be rectilinear or that embodiments of the invention conform to a rectilinear shape or that the atmospheric opening be at grade level. The elements of the invention can be configured to fit within downwardly vertically projected dimensions of any ventilation shaft surface opening serving any underground tunnel, chamber, room or other underground structure, whether rectilinear, circular or oval or some other shape.

In the descriptions of exemplary embodiments that follow, the passage closing position is one in which the panel or panels of the embodiments are horizontal. The concept of the invention is not limited to this disposition. Restrains or stops for stopping panel lowering may be positioned to stop the downward travel above horizontal and still close a ventilation passage. The described embodiments are non-limiting illustrations of examples in which the concepts of the invention may be implemented.

The exemplary embodiments of the invention comprise a ventilation shaft manual closure assembly. Support for the exemplary assembly embodiment includes opposed lateral sidewalls for arrangement in a vertical ventilation shaft to an underground ventilation duct fluidly communicating through the ventilation shaft to an atmospheric opening of the shaft. The atmospheric opening may be cylindrical and the support cylindrical. The atmospheric opening may be rectilinear and the support quadrilateral. As mentioned, in the exemplary embodiments, the atmospheric opening is rectilinear.

The support inclusive of the lateral sidewalls is sized to internally fit in the vertical shaft between the ventilation duct and the atmospheric opening. In an embodiment, the support has horizontal flanges transverse to the sidewalls for projection across a top of the shaft to hang the support in the shaft. The support defines a passage between top and bottom openings of the support for fluid communication of the ventilation duct up through the support to the atmospheric opening.

In an exemplary embodiment, one or more downwardly rotatable panels may be used, mounted in an upright home position not obstructing the ventilation passage that fluidly communicates the underground ventilation duct with the atmospheric opening of the ventilation shaft, to allow ventilation as usual when there is no flooding threat. In one exemplary embodiment, a single panel is mounted in the home position to a side of such a passage to alone gravitationally fall from home position to a passage closing position across the entirety of the passage to protect the underground ventilation duct from flooding. In another exemplary embodiment, a pair of panels is mounted on opposite sides of the passage, to gravitationally fall from home position down toward each other to passage closing positions to combine to close the passage. In yet another exemplary embodiment, a pair of panels is mounted centrally in the passage for rotation of the panels in directions opposite each other from the home position to a lower passage closing position. An advantage of paired panels is that they may be used to close a passage that is wider than it would be feasible for a single taller panel to close.

The manual closure assembly comprises one or more panels having proximal and distal ends, a top side and a bottom side. The proximal end connects with a horizontal hinge having an axis perpendicular to the opposed lateral sidewalls for manual rotation of a panel upwardly to an upright home position not obstructing the passage and rotation from the home position downwardly solely by gravitational impetus of its own weight to reach a lower passage closing position. The one or more panels have a profile that closes the passage when each panel gravitationally rotates to the passage closing position.

At least one restraint limits the downward rotation of each panel to the lower passage closing position. The restraint may be one or more foldable or flexible members anchored at one end to an upper portion of a suspension member (next mentioned) and fastened at the other end to the topside of a panel, or it may comprise one or more stops that do not obstruct the passage and that are located within and connected to the support proximate the bottom opening.

In an exemplary embodiment, adjacent sidewalls include a base having rounded corners with a first radius of curvature and in which the distal portions of the panels have rounded corners with a radius of curvature substantially the same as the first radius of curvature of the sidewall corners they sweep when rotating to the passage closing position. In an exemplary embodiment, the panels include seals for sealing the passage in the passage closing position.

A suspension member unobstructively horizontally spans the passage proximate the support top opening and holds the one or more hinge connected panels in the passage. The suspension member is liftingly removably supported on the opposed lateral sidewalls proximate the support top and bottom openings. The suspension member has at least one handle connected to the suspension member for holding the suspension member to move it vertically into or out from the supports on the opposed lateral sidewalls. The suspension member may comprise a single unitary vertically extending member holding the horizontal hinge and the panels connected to the hinge, or may comprise a beam having vertically hung straps holding the horizontal hinge and the panels connected to the hinge. In an exemplary embodiment, the horizontal hinge comprises a hinge mounting member held by the suspension member and a plurality of hinge members mounted on the hinge mounting member. In an exemplary embodiment, each hinge member comprises a stationary member, a movable member and a hinge pin interconnecting the stationary and movable members, the stationary member connecting to the hinge mounting member, and the moveable hinge member connecting to the proximal end of a panel. The horizontal hinge may also comprise a continuous hinge, sometimes called a piano hinge, or any other hinge comprising a moveable joint that connects two linked panels and on which the panels raise and lower.

In an exemplary embodiment, the suspension member is liftingly removably supported centrally between the opposed lateral sidewalls, and suspends a pair of panels in the ventilation passage for rotation of the panels in directions opposite each other from or to said upright home position. In an exemplary embodiment, the atmospheric opening is rectilinear and said support is quadrilateral, the opposing sidewalls each attach centrally in the ventilation passage adjacent the top opening of the shaft a cradle having a pair of spaced apart parallel vertical arms above and optionally connecting to and standing upright on a bar, optionally a horizontal bar, for liftingly removably receiving and supporting the beam within such vertical arms and on the bar.

In an exemplary embodiment, a quadrilateral support has at least one indicator on at least one sidewall adjacent the opposed lateral sidewalls to indicate where structure on a panel is located below the indicator. In such embodiment, the suspension member has ends each of which bears a key extending laterally past a side of the suspension member and each cradle is keyed to receive the key only in one arm of the cradle so a the panel having that structure is located below the indicator In an exemplary embodiment employing such suspension support cradles, such centrally supported suspension member may comprise a beam having vertically hung straps holding the horizontal hinge and the panels connected with said horizontal hinge. Such beam has ends, lateral sides between the beam ends, and a quadrilateral beam end plate attached to each beam end. Each beam end plate has lateral sides extending laterally past the lateral sides of the beam ends. The cradles each comprise a vertical included right angle between vertical mutually perpendicular projections of the vertical arm, one projection of each vertical arm attaching to one of the opposed sidewalls. The other projection of each vertical arm is unattached to such one sidewall. Such unattached projections and the included right angles of the vertical arms face each other. The attached projections are spaced apart sufficiently for vertically receiving the beam end plate within the pair of vertical arms. In an exemplary embodiment having such cradles and bean end plates, one side of the lateral sides of each beam end plate extends laterally further than the other lateral side of such beam end plate, and one unattached projection of one vertical arm of a cradle has a length longer than the unattached projection of the other vertical arm of that cradle for accepting the lateral side of the beam end plate that extends further than the other lateral side of that beam end plate, thereby to receive the beam end plate within the pair of vertical arms.

In an exemplary embodiment, the quadrilateral support has at least one indicator on at least one sidewall adjacent the opposed lateral sidewalls. The indicator indicates that certain structure on a panel is to be located below the indicator. The longer side of the beam end plates and the longer inset of the vertical arms accepting only the longer side of the end plates allow the beam to be horizontally placed in the cradles only in an orientation placing the particular panel having that structure below the indicator when the panel is in the passage closing position.

In an exemplary embodiment in which the beam support cradles allow the beam to be positioned only in one horizontal orientation, the hinge mounting member has ends, lateral sides between the hinge mounting member ends, and a quadrilateral hinge mounting member end plate attached to each hinge mounting member end. The hinge mounting member end plates each have lateral sides extending laterally past the lateral sides of the hinge mounting member ends. The opposing sidewalls each attach a pair of spaced apart horizontal anchor bars centrally in the passage below the cradle and adjacent the bottom opening. Each anchor bar comprises an included right angle between mutually perpendicular horizontal projections of unequal length, the shorter projection of each anchor bar attaching to one of the opposed sidewalls, the longer projection of that anchor bar being unattached to the one sidewall. The unattached projections and the included right angles of the anchor bars face each other. The attached projections are spaced apart sufficiently to vertically receive the hinge mounting member end plate within the pair of anchor bars. Thus where the quadrilateral support has at least one indicator on at least one wall adjacent the opposed lateral sidewalls to indicate that structure on a panel is located below the indicator, the beam end plate, the cradle vertical arms, the hinge mounting member end plate end plate and the anchor bars cooperatively orient placement of the beam and the hinge mounting member hung from the beam so a panel having that structure will be located below the indicator when the panel is in the passage closing position.

Figure 30:
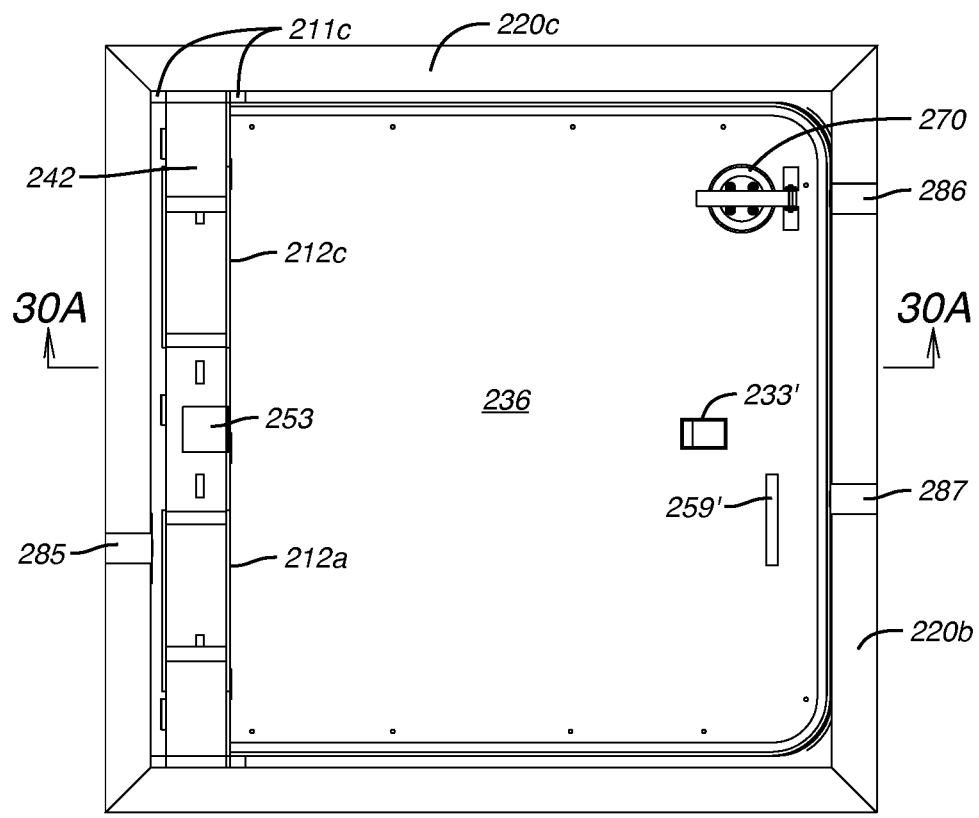
FIG. 30 is a top plan view of a single panel assembly received in a quadrilateral support showing the panel deployed in a passage closed position.
Figure 31:
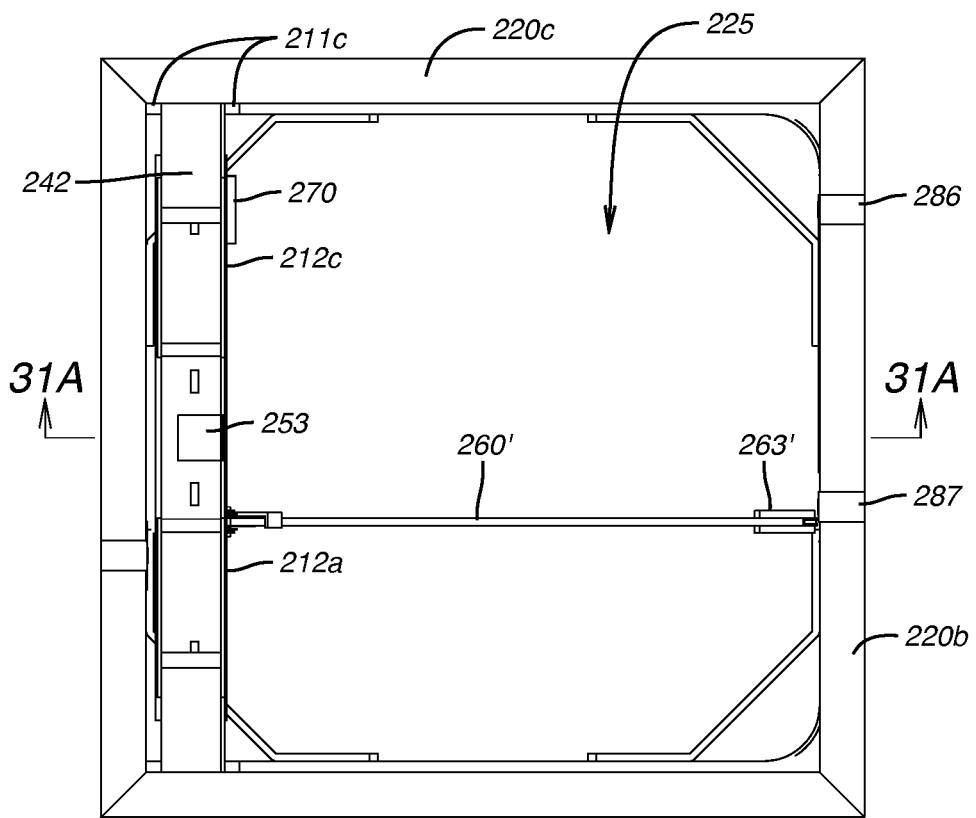
FIG. 31 is a top plan view of a single panel assembly received in a quadrilateral support showing the panel completely raised to home position
Figure 31A:
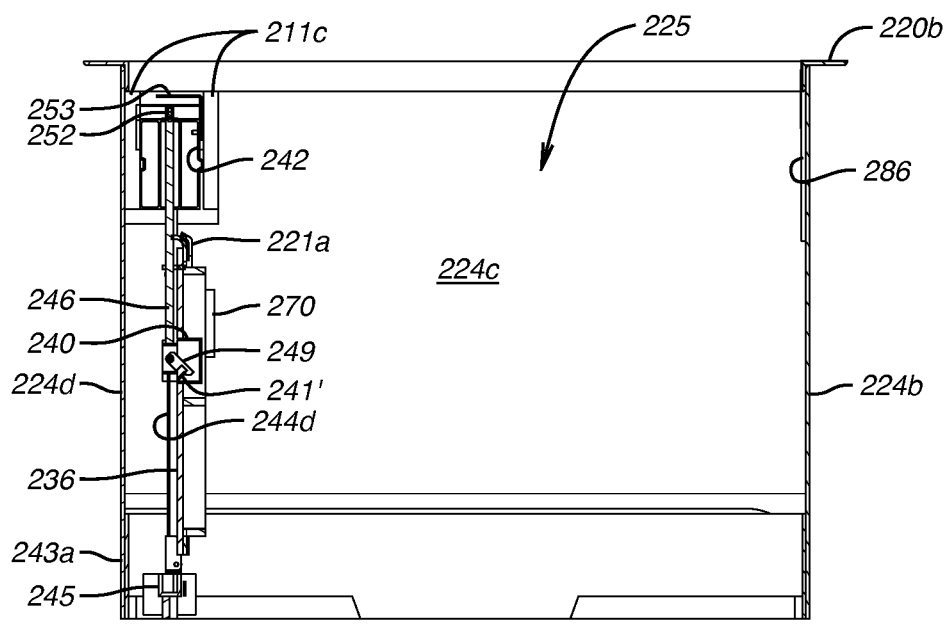
FIG. 31A is a cross sectional view of the embodiment of FIG. 31 taken along the line 31A-31A of FIG. 31.

Referring now to the drawings, they show an exemplary embodiment of an apparatus for preventing downward flow of surface water into an underground ventilation duct fluidly communicating through a ventilation shaft to a rectilinear atmospheric opening of the shaft. FIGS. 1-29 show exemplary embodiments having a pair of panels. FIGS. 30-31A show exemplary embodiments having a single panel. Referring to FIGS. 1, 2 and 2A initially, an exemplary embodiment comprises a support embodied in a quadrilateral or four-sided box 210 inclusive of sidewalls 224 (224a, 224b, 224c, 224d) having at the upper extent of the sidewalls flanges 220 (220a, 220b, 220c, 220d) transverse to the sidewalls 224 for extension over a top of walls of a ventilation shaft for suspension of box 210 vertically in the shaft to define a passage 225 between top opening 226 and bottom opening 228 of box 210 for fluid communication of a ventilation duct up through box 210 to an atmospheric opening 214. Cradles 211a, 211c are formed in the upper sides of opposing sidewalls 224a and 224c respectively. The apparatus shown is suitable as a drop in solution to sealing vent passages from storm waters by lowering it into a ventilation shaft to rest on walls of the shaft. In place, a grating (not pictured) covers top opening 226. In normal operation, operator access to the interior of box 210 is through the grating.

Although an exemplary embodiment as described herein employs a four sided box support 210, some locations may allow use of a support in the shape of a hollow cylinder also having stops 230 proximate a bottom opening of the support, and this form is comprehended within the scope of the invention.

Stops 230a, 230 b, 230c and 230d in the form of corner braces in box 210 are within and connected to sidewalls 224 proximate bottom opening 228 and do not obstruct passage 225. Adjacent sidewalls include a base 227 having rounded corners 227a, 227d above respective stops 230a, 230d, and a base 229 having rounded corners 229b and 229c above respective stops 230b, 230c. Rounded corners 227a, 227d and 229b, 229c have a round corner radius of curvature.

Referring now to FIGS. 3 and 4, a beam 242 comprising extruded tubing unobstructively horizontally spans across passage 225 and connects to opposed sidewalls 224a, 224c of box 210 proximate top opening 226. Beam 242 is lodged in cradles 211a, 211c, conveniently lowered into channels 211a, 211c by operators holding beam foldable handles 212a, 212c. Beam 242 and straps 244 described below comprise a suspension member for equipment described below. Beam 242 and its attached equipment can be lowered into place as a complete assembled unit 201 after box 210 is installed in ventilation shaft resting on flanges 220. Assembled unit 201 can be removed from box 210 for servicing by withdrawing beam 242 from channels 211a, 211c by means of handles 212a, 212c.

Although an exemplary embodiment as described employs a suspension member comprising a beam 242 and straps 244 for supporting equipment described below, the scope of the invention is not limited to such embodiment. A suspension member may be employed other than beam 242 and straps 244, for example a suspension member can be a single unitary extending solid or fenestrated plate. An advantage of the described beam 242 and straps 244 is a lighter weight imposing a lesser load on flanges 220 than a solid plate, but a fenestrated plate would serve a lighter load advantage as well, albeit likely a more costly element.

Referring particularly to FIGS. 5, 8-11, a hinge mounting member 245 unobstructively horizontally spans across passage 225 connected by a plurality of straps 244a, 244b, 244c, 244d to beam 242. Lodged in cradles 211a and 211c, beam 242 and hinge mounting member 245 spanning between sidewalls 224a, 224c are centered in passage 225 of box 210 with beam 242 directly over hinge mounting member 245. Hinge mounting member 245 mounts and supports a plurality of hinge members 243. Hinge members 243 each comprise a stationary member 243b, a movable member 243a and a hinge pin 243c that interconnects stationary member 243b and movable member 243a. Stationary member 243b connects to hinge mounting member 245. Hinge mounting member 245 includes a stiffener bar 231 affixed lengthwise along to the inferior surface of hinge mounting member 245.

A pair of opposing panels 234, 236 each having proximal and distal portions, respectively 234a, 234b and 236a, 236b, are connected at proximal portions 234a, 236a by moveable hinge members 243a to stationary hinge members 243b and thereby to a hinge mounting member 245 and from hinge mounting member 245 via straps 244a, 244b to beam 242. The connection of moveable hinge members 243a to the proximal portions 234a, 236a of panels 234, 236 on hinge pins 243c forms respective pivot axes of panels 234, 236 for vertical rotation of panels 234, 236. Panels 234, 236 rotate in directions opposite each other from or to an upright home position under beam 242 (indicated generally by reference numeral 213). Rotation of the panels upwardly (one clockwise, the other counterclockwise) to home position 213 is effected manually as further described below. The home position of the panels tucked under beam 242 does not occlude passage 225. Rotation of the panels downwardly (one clockwise, the other counterclockwise) is by gravity acting solely on the mass of the panel when the panels are released from the home position, as further described below. Panels 234, 236 in rotation fall solely under the gravitational impetus of their own weight from the upright home position to a lower passage closing position (indicated generally by reference numeral 215) where further rotation is prevented by stops 230a, 230b, 230c, 230d and 230e. Each panel has a profile that closes the passage when the panels gravitationally rotate to the passage closing position.

Panels 234, 236 have a top side plate 238 and a bottom side 232. Bottom side 232 is crisscrossed with internal cross braces 237, 239 for rigidity. The distal portions of the panels have rounded corners 219 with a radius of curvature substantially the same as the radius of curvature of the sidewall corners 229a, 229b, 229c and 229d they sweep when rotating to the passage closing position. The panels include peripheral distal and lateral seals 221, 222 for sealing the passage in the passage closing position, seals 221a, 222a for panel 234 and seals 221b, 222b for panel 236. A gasket seal 223 (223a for panel 234, 223b for panel 236) spans the proximal ends of bases of panels 234, 236 below pin 243c and seals bottom opening 228 at the proximal ends of panels 234, 236 when the panels are in the passage closing position.

Panels 234, 236 are held in home position 213 by a panel holder 240. Panel holder 240 is movably supported in box 210 by a grip rod 246 connected to panel holder 240. Rod 246 is mounted through beam 242 slideably translatable through a brace 255 fastened between straps 244b, 244c and terminates above beam 242 at a T-handle grip 252 under a cover 253 sheltering T-handle grip 252 from pedestrian view through a grating covering box 210 to reduce if not avoid gratuitous tampering with the apparatus and unwanted deployment of the panels by mischief makers. Panel holder 240 includes moveable member 247 on a side facing panel 234 and a movable member 249 on a side facing panel 236. It is the moveable member components 247, 249 of panel holder 240 that catch and hold panels 234, 236 in the upright home position 213. Rod 246 and grip 252 comprise a panel releaser. The T-handle configures grip 252 for convenient grasping, such as by a projection of a hooking reach tool that can be vertically inserted through a small opening in a grating over box 210 to reach under cover 253 and hook grip 252 for lifting panel holder 240. Lifting rod 246 by grip 252 moves panel holder 240 upwardly to cause moveable members 247, 249 to release held panels 234, 236 and allow the panels to rotationally gravitationally fall solely by their own mass from the upright home position 213 to the lower passage closing position 215.

Referring particularly to FIGS. 5-8, moveable members 247, 249 each comprise a latch engageable with latch catch 235, 235'. Latches 247, 249 are vertically pivotal on a pivot axis 254 at a proximate end of the latches. Pivot axis 254 resides inside panel holder 240 parallel to the panel axes of pins 243c paralleling either side of hinge mounting member 245. Each latch 247, 249 pivotally extends externally from panel holder 240 to a distal inferior return 248, 248' having a sloped surface 250, 250' ending at an inset notch 251, 251'. Recesses 233, 233' and panel holder 240 are horizontally and vertically aligned with each other such that when panel 234, 236 is rotated vertically upward, the inferior distal return 248, 248' of latch 247, 249 is brought into sliding contact with ramp 241, 241', whereupon sloped surface 250, 250' slides on ramp 241, 241' until inset notch 251, 251' passes over latch catch edge 235, 235', capturing latch 247, 240, which holds panel 234, 236 as the panel completes upward rotation to home position 213.

Panels 234, 236 are provided with structure to raise the panels manually to home position 213. Each panel 234, 236 has a handle 259, 259' on its top side 238, 238' remote from the pivot axes of pins 243c of the hinge members 243 to which the proximate ends 234a, 236a of the panels 234, 236 are connected. A reach tool with a terminal projection can be used by an operator and inserted through a grating over box 210 to grasp handle 259, 259' to lift panel 234, 236. A lift arm 260 for panel 234 and a lift arm 260' for panel 236 manipulated by a second reach tool to provide a mechanical assist giving lateral thrust against the bottom side of a panel to complete rotation of the panel to upright home position.

Figure 9:
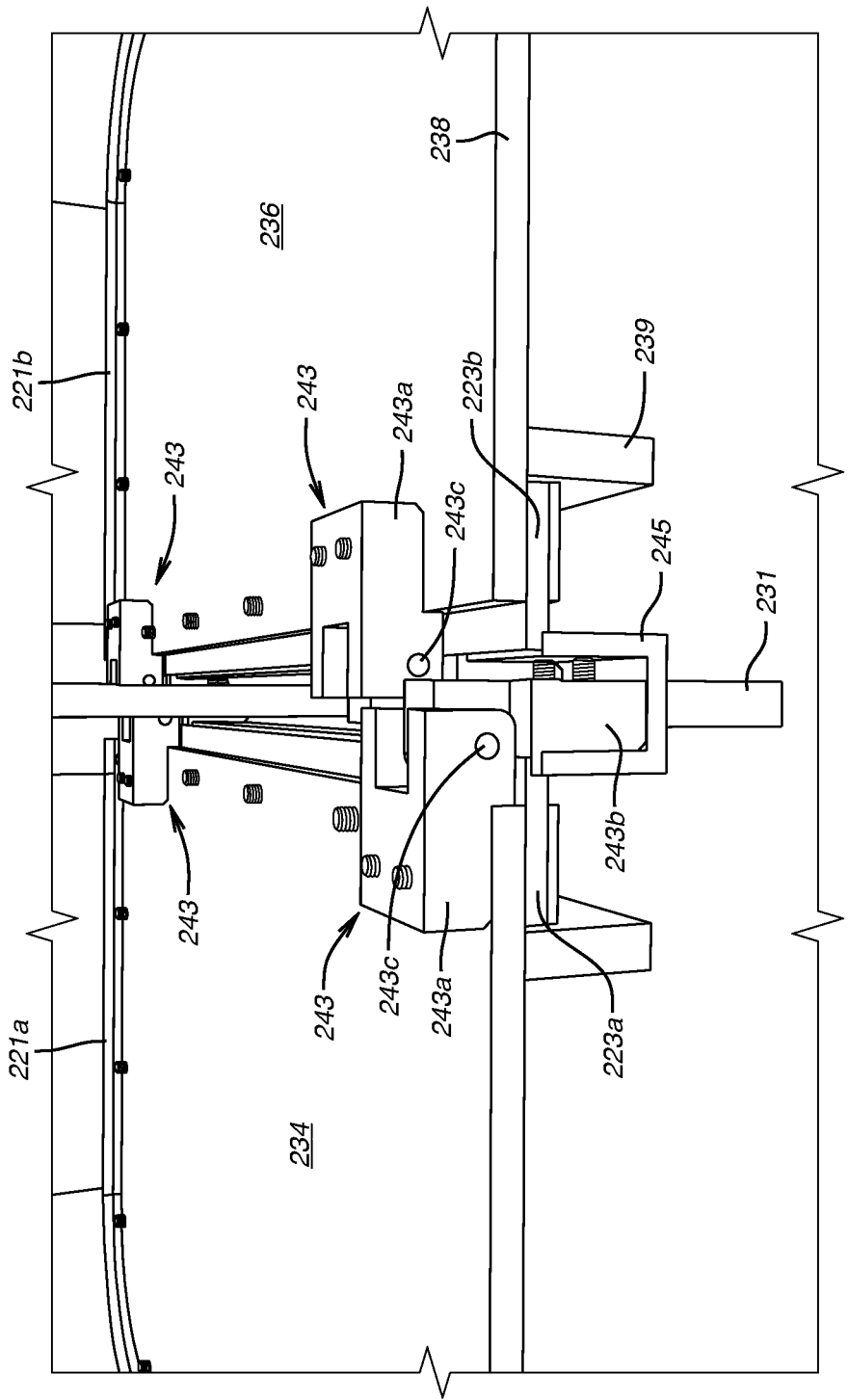
FIG. 9 is a frontal graphic showing the panels of FIG. 5 in lowered position in place in the support of FIG. 1
Figure 10:
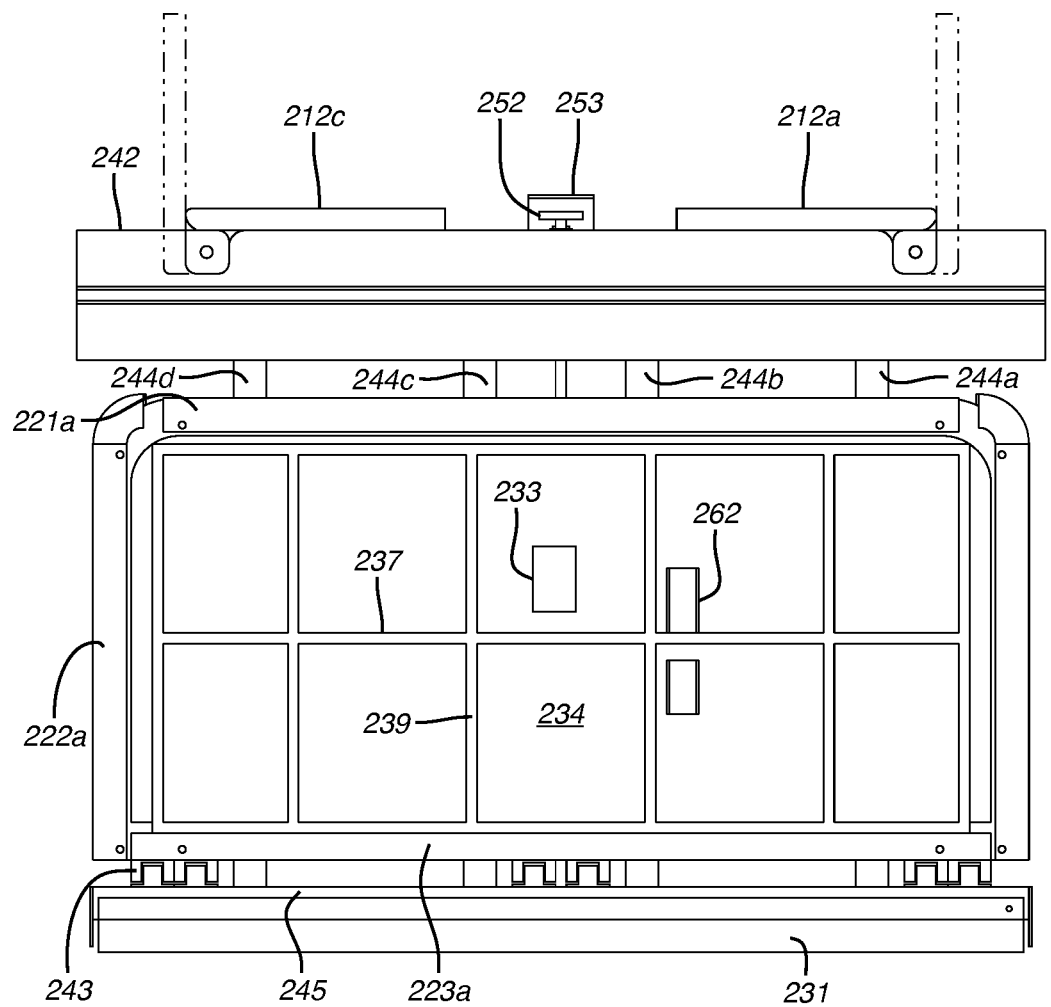
FIG. 10 is a side elevational view of the panel assembly of FIG. 5 with the panels in raised home position.
Figure 11:
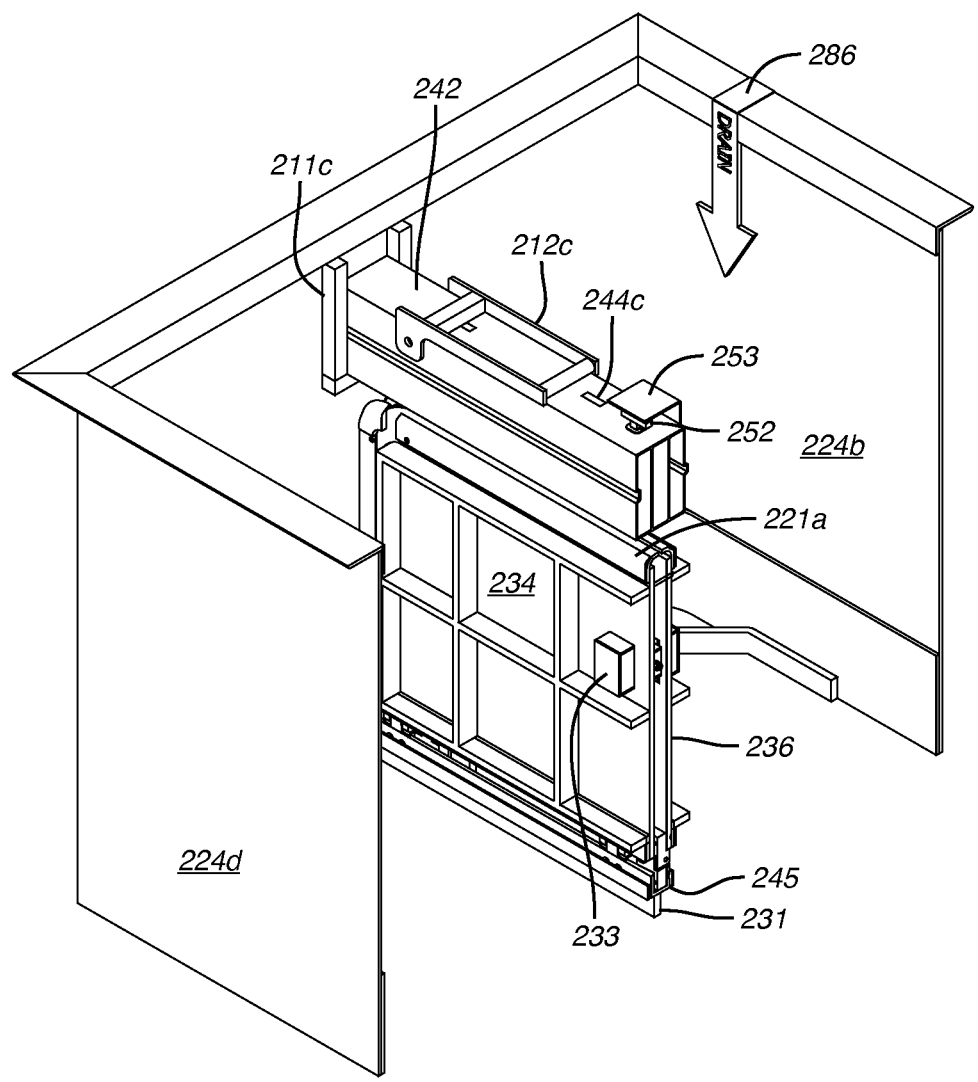
FIG. 11 is a cutaway isometric view of the panel assembly of FIG. 5 in place in the quadrilateral support of FIGS. 1, 2 and 2A illustrating the panels of FIG. 5 in raised home position.
Figure 12:
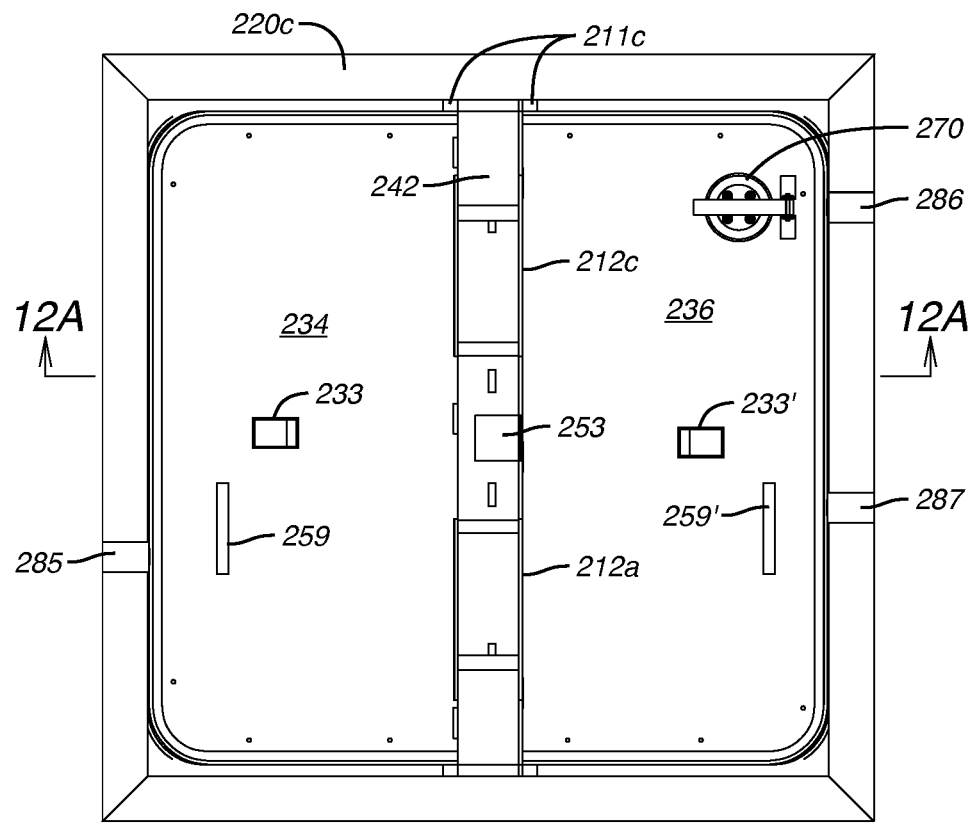
FIG. 12 is a top plan view of the panel assembly of FIG. 5 in place showing the panels in lowered position.
Figure 12A:
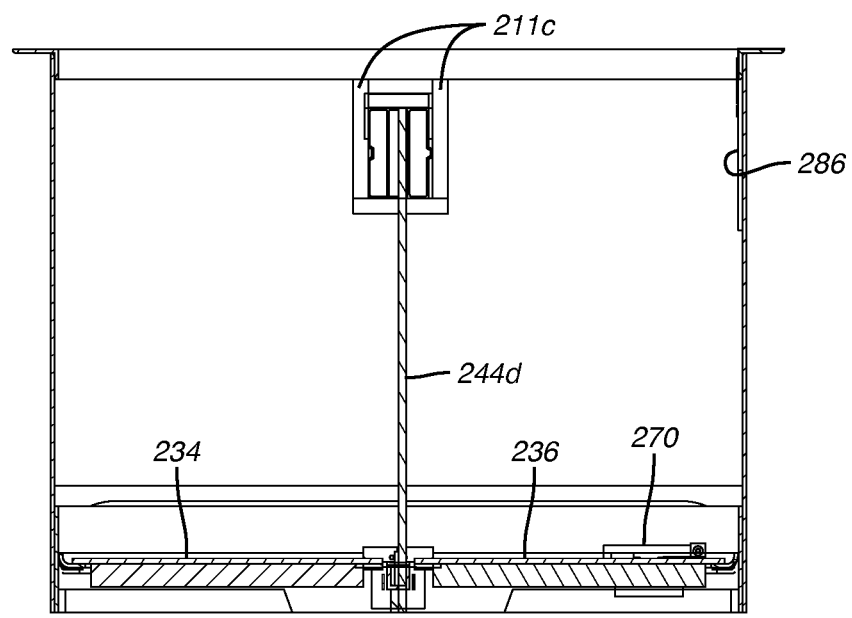
FIG. 12A is a cross sectional view taken along the line 12A-12A of FIG. 12.

At least one of the panels, such as panel 236 may be fitted with a drain 270 intermediate the proximate and distal ends of the panel, as shown in FIGS. 9 and 10.

As depicted in FIGS. 1, 2, 2A, 3 and 4 the quadrilateral box support 210 has a single indicator 285 on one sidewall 224d adjacent the opposed lateral sidewalls 224a, 224c and two indicators 286, 287 on the facing sidewall 224b. The indicators are labeled indicator arrows 285, 286, 287 that point to where certain structure on a panel is located below the indicator. The single indicator 285 labeled "LIFT ARM" points to a position where a lift arm 260 is located on panel 234; sidewall 224b having two indicators 286, 287 labeled respectively "DRAIN" and "LIFT ARM" points to a position on panel 236 here a drain 270 is located and another position where a lift 260' arm is located.

The purpose of the labeled indicators 285, 286, 287 is to tell a worker where to insert a reach tool through a grating covering the support 210 to find and manipulate the structure indicated by the label on the indicator. It is therefore important for suspension member 242 holding the panels 234, 236 having the structures 260, and 260', 270 respectively to be placed in cradles 211a, 211c so the panels having the structures are located next to the sidewall where the indicators for the structures are located. Panel 236 having a lift arm 260' and a drain 270 needs to be located adjacent sidewall 224b. To assure the correct placement, suspension member 242 has ends each of which bears a key extending laterally past a side of the suspension member, and each cradle 211a, 211c is keyed to receive the key only in one arm of the cradle so a panel having an indicated structure is located below the indicator. That is, cradles 211a, 211c are keyed and suspension member 242, for example beam 242, is fitted with a key that allows beam 242 and with it suspended panels 234, 236 to be installed in support 210 only in an orientation where panel 236 having the two structures indicated, in this case, the drain 270 and a lift arm 261', is adjacent the sidewall 224b where the two indicators 286, 287 are located. This in turn automatically puts panel 234 having just the one structure indicated on the sidewall 224d where the one indicator 285 is located, in this example, for lift arm 260.

Figure 13:
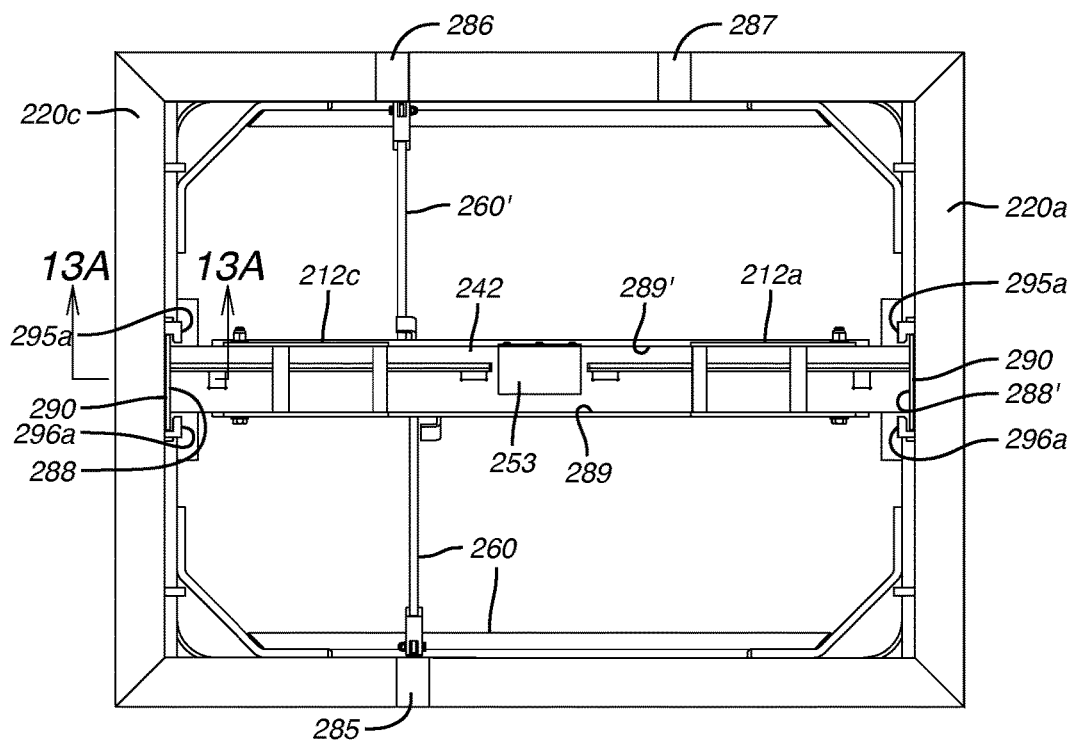
FIG. 13 is a top plan view of variations of the panel assembly of FIG. 5 and the cradle support of FIG. 1 (panels shown raised in home position).
Figure 13A:
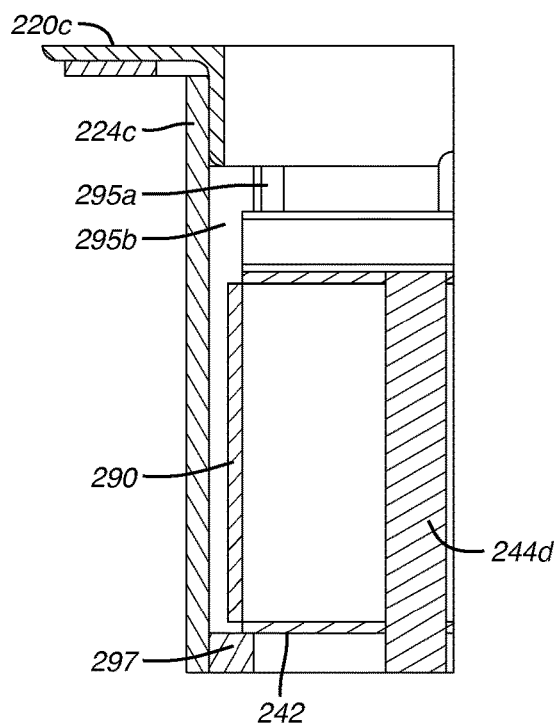
FIG. 13A is a cross section viewed along the line 13A-13A of FIG. 13 showing a variant of the end of the beam portion of the panel assembly of FIG. 5.
Figure 14:
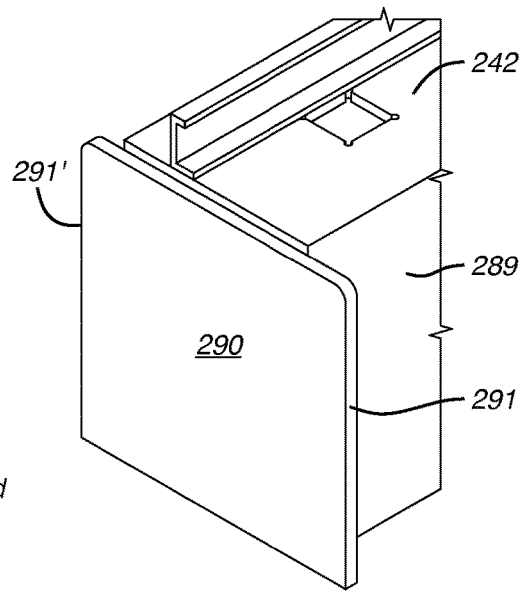
FIG. 14 is a perspective of the variant depicted in cross section in FIG. 13A.

Referring to FIG. 13, beam 242 has ends 288, 288', lateral sides 289, 289' between beam ends 288, 288', and a quadrilateral beam end plate 290 attached to each beam end. Referring to FIGS. 13A and 14, beam end plate 290 has lateral sides 291, 291' extending laterally past the lateral sides 289, 289' of the beam ends.

Referring to FIGS. 15-18, keyed cradles 292a, 292c (only one is shown, the other is identical) each comprise a pair of vertical arms 293, 293' having included right angle 294, 294' between vertical mutually perpendicular projections 295a, 295b of vertical arm 293 and 296a, 296b of vertical arm 293', one projection 295b of vertical arm 293 and the corresponding projection 296b of vertical arm 293' attaching to one of the opposed sidewalls 224a or 224c. The other projection 295a of vertical arm 293 and 296a of vertical arm 293' is unattached to such one sidewall 224a or 224c. Such unattached projections and the included right angles of the vertical arms face each other. The attached projections 295b, 296b are spaced apart sufficiently for vertically receiving the beam end plate 290 within the pair of vertical arms 293, 293' and are rest upon a horizontal bar 297.

Figure 18:
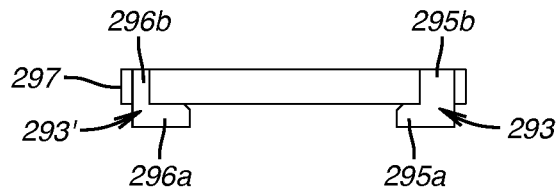
FIG. 18 is a top plan view of the cradle variant depicted in FIG. 15.
Figure 15:
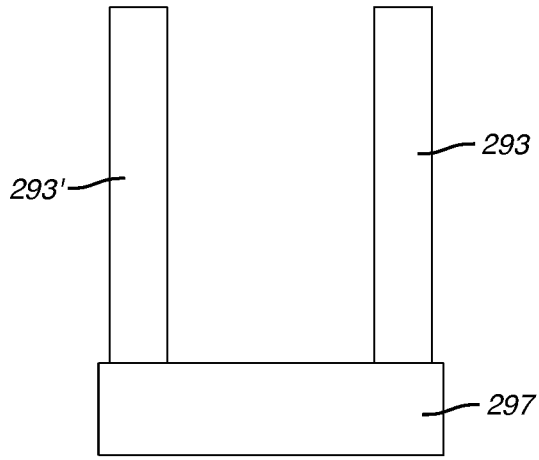
FIG. 15 is a front elevation view of a cradle variant of the support of the embodiment of FIGS. 1-4.
Figure 17:
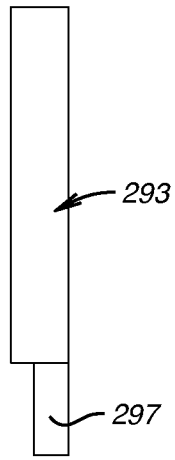
FIG. 17 is a side elevation view of the cradle variant depicted in FIG. 15.
Figure 16:
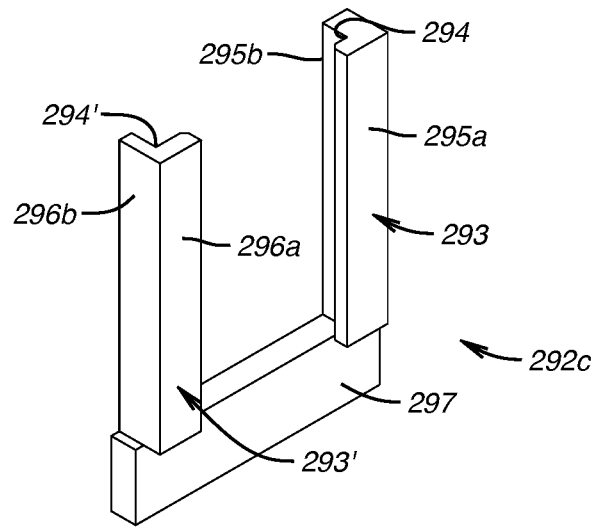
FIG. 16 is a perspective view of the cradle variant depicted in FIG. 15.
Figure 19:
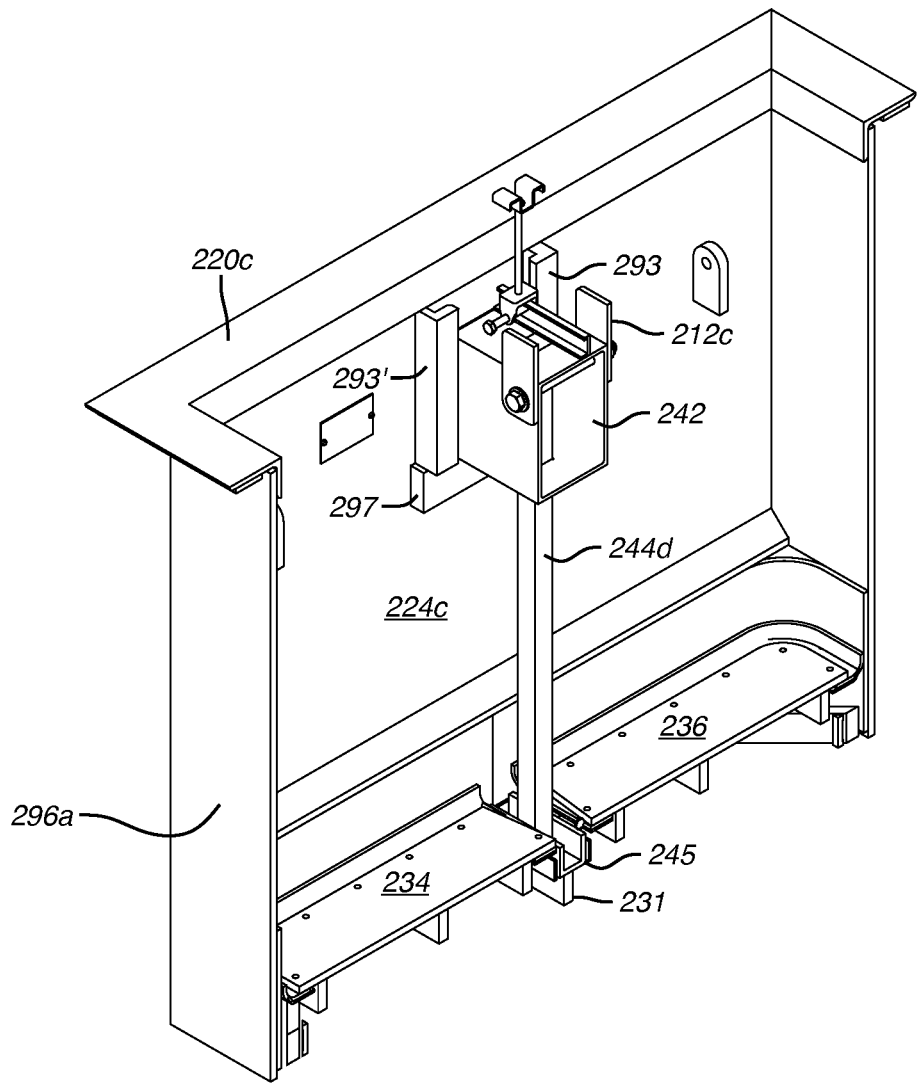
FIG. 19 a cutaway isometric view of the panel assembly variant of FIG. 5 showing the cradle support variant of FIGS. 15-18 supporting a truncation of the variant assembly of FIG. 5.
Figure 20:
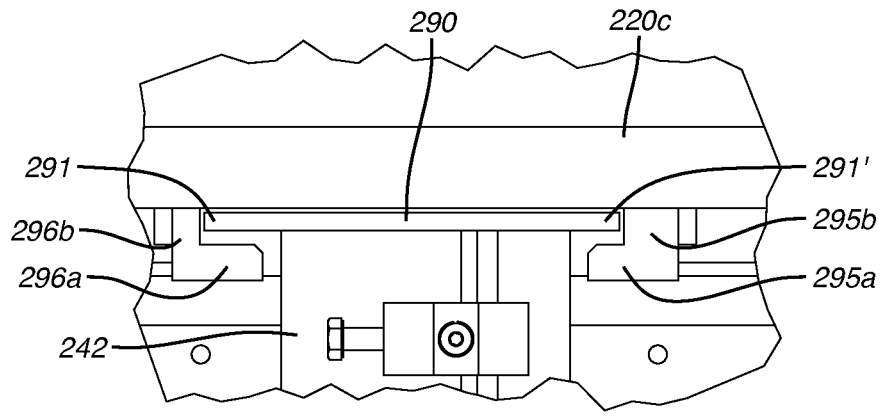
FIG. 20 is a top plan view showing the variant of FIGS. 13A and 14 in place in the cradle variant support of FIGS. 15-18.
Figure 21:
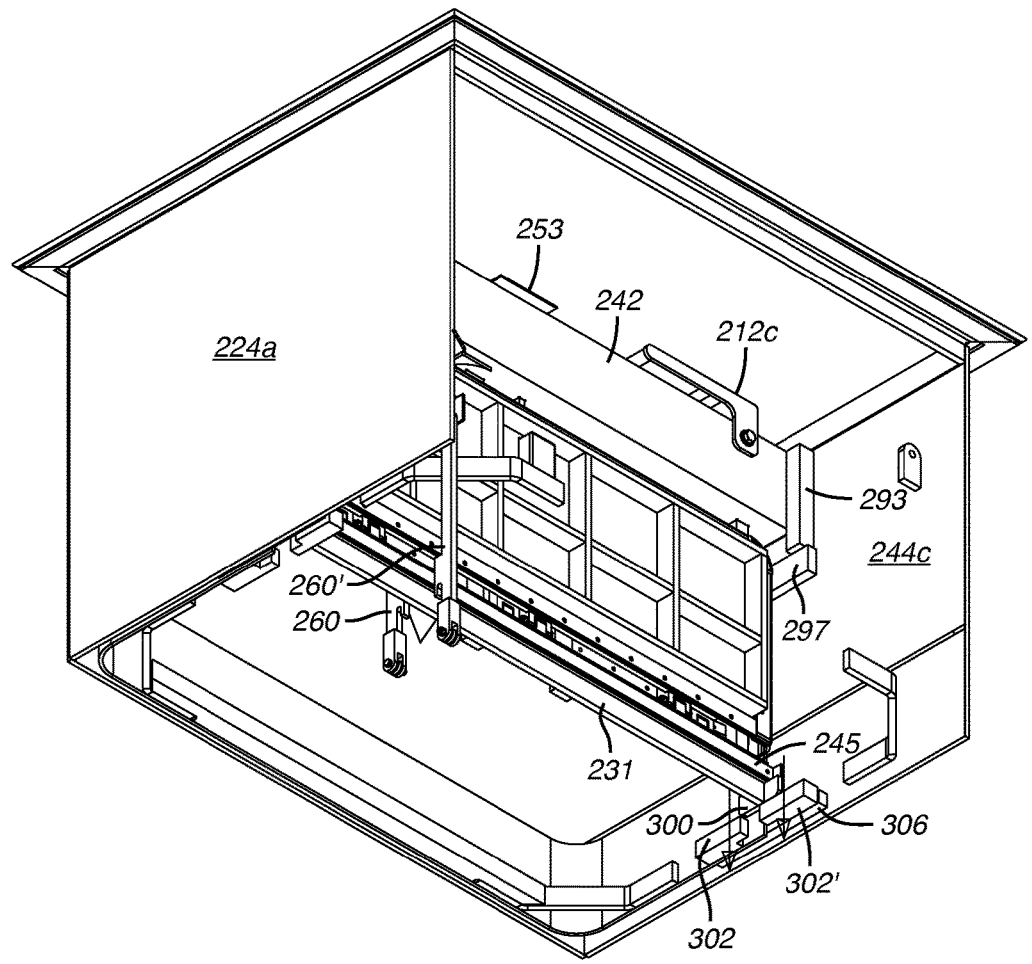
FIG. 21 is a perspective bottom view of an embodiment with some components removed showing the position of the variant panel assembly of FIG. 5 as it is lowered into place into the cradle of FIGS. 15-18 and into a lower support anchorage depicted in FIGS. 25-27.

Referring to FIGS. 14 and 20, side 291 of the lateral sides 291, 291' of each beam end plate 290 extends laterally further than lateral side 291' of beam end plate 290 providing a key. Referring to FIGS. 16, 18 and 20, unattached projection 296a of vertical arm 293' of cradle 292c has a length longer than unattached projection 296a of the other vertical arm 293' of cradle 292c for accepting the lateral side 291 key of beam end plate 290 that extends further than the other lateral side 291' of that beam end plate 290, thereby to receive the beam end plate 290 within the keyed pair of vertical arms 293, 293'. The longer side 291 of the beam end plates 290 is the key and the longer inset at unattached projection 296a of vertical arms 293, 293' is the keyed element that accepts only the longer side 291 key of the end plates 290 and thereby allows beam 242 to be horizontally placed in the cradles 292a, 292c only in an orientation placing the particular panel 234, 236 having a structure the same as the label on the sidewall adjacent that sidewall and below that indicator.

Figure 28:
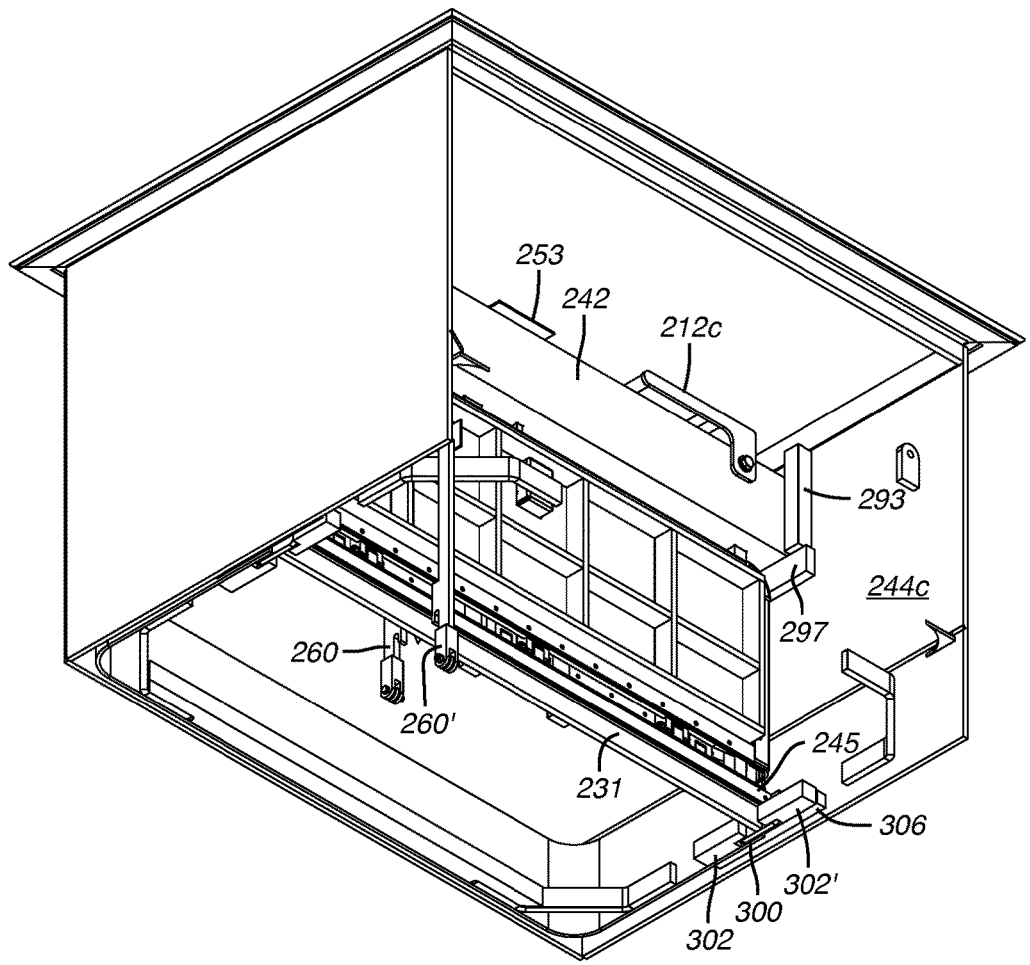
FIG. 28 is a perspective bottom view with some components removed showing the position of the assembly of FIG. 5 in place in the cradle of FIGS. 15-18 and anchored in place in the lower anchorage support depicted in FIGS. 24-26
Figure 29:
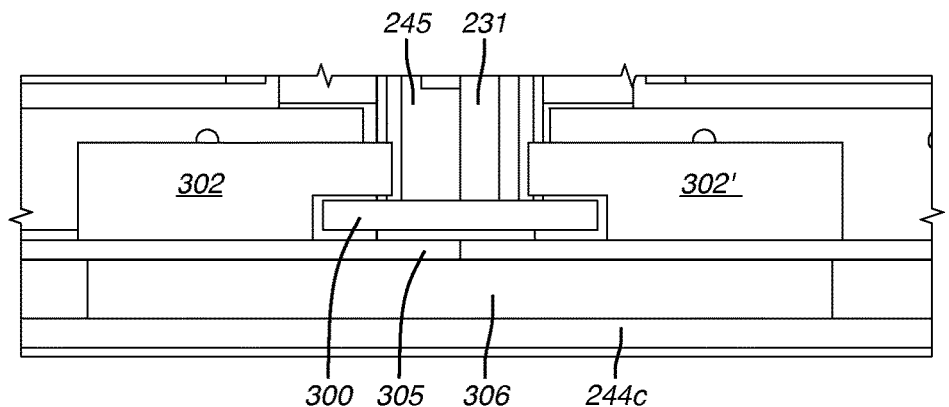
FIG. 29 is a top plan view of the connector plate of FIGS. 22-24 anchored in place in the lower anchorage support depicted in FIGS. 25-27.

Cooperating with the key and keyed function of the end plates 290 and the cradles 292a, 292c, the hinge mounting member 245 has ends 298, 298', lateral sides 299, 299' between hinge mounting member ends 298, 298', and a quadrilateral hinge mounting member end plate 300 attached to each hinge mounting member end 298, 298'. The hinge mounting member end plates 300 each have lateral sides 301, 301' extending laterally past the lateral sides 299, 299' of the hinge mounting member ends 298, 298. The opposing sidewalls 224a, 224c each attach a pair of spaced apart horizontal anchor bars 302, 302' centrally in the passage below a cradle 292a or 292c, and adjacent the bottom opening 228. Anchor bar 302 comprises an included right angle 303 between mutually perpendicular horizontal projections 304a, 304b of unequal length, the shorter projection 304b attaching to one of the opposed sidewalls 224a or 224c, the longer projection 304a of anchor bar 302 being unattached to the one sidewall 224a or 224c. Similarly, anchor bar 302' comprises an included right angle 303' between mutually perpendicular horizontal projections 305a, 305b of unequal length, the shorter projection 305b attaching to one of the opposed sidewalls 224a or 224c, the longer projection 305a of anchor bar 302' being unattached to the one sidewall 224a or 224c. The unattached projections and the included right angles of the anchor bars face each other. The attached projections 304b, 305b are spaced apart sufficiently to vertically receive the hinge mounting member end plate 300 within the pair of anchor bars. FIG. 20 shows beam 224 descending into cradle 292c and anchor bars 302, 302'. FIG. 27 shows beam 24 landed into place in cradle 292c and hinge mounting member 245 landed in place in anchor bars 302, 302'. FIG. 28 shows the fitment of hinge mounting member 245 with end plate 300 between anchor bars 302, 302'. A seal 305 separates brace 306 from anchors 302 and 302'.

Thus where the quadrilateral support 210 has at least one indicator on at least one wall 224b or 224d adjacent the opposed lateral sidewalls 224a, 224c to indicate that structure on a panel is located below the indicator, the beam end plate 290, the cradle vertical arms 293, 293', the hinge mounting member end plate end plate 300 and the anchor bars 302, 302' cooperatively orient placement of the beam 242 and the hinge mounting member 245 hung from the beam so a panel having that structure will be located below the indicator when the panel is in the passage closing position.

Referring now to FIGS. 30-31A, another exemplary embodiment employs a single panel. Components in the single panel exemplary embodiments that are the same as in the exemplary pair of panels embodiments have the same reference numbers as in the exemplary pair of panels embodiments. The single panel exemplary embodiment, as with the other exemplary embodiments, assumes a rectilinear atmospheric opening of a vertical ventilation shaft and allows ventilation as usual through the shaft to an underground ventilation duct fluidly communicating through the ventilation shaft to an atmospheric opening at a grating over the shaft and on threat of flooding is operable to prevent downward flow of surface water into the underground ventilation duct. The single panel exemplary embodiment, like the pair of panels exemplary embodiments comprises a support embodied as a four-sided vertical box open at bottom and top to define a passage 225 between top and bottom openings of the box support. Some details are omitted for simplicity of exposition but will be understood from descriptions of the pair of panels exemplary embodiments. Exemplary flanges, e.g. 220*b*, 220*c* horizontally extend and rest atop vertical walls of a ventilation shaft (flanges 220*a*, 220*d* are not indicated by reference numerals in FIGS. 30-31A but are understood from the prior exemplary embodiments). Support box sidewalls 224*b*, 224*c* and 224*d* are visible in the sectional views FIGS. 30A and 31 A (sidewall 224*a* will be understood from descriptions of the exemplary embodiments of the pair of panels. The four sidewalls 224*a*, 224*b*, 224*c*, 224*d* of box 218 vertically fit inside the four vertical ventilation shaft walls, as in the pair of panels exemplary embodiments. Stops like stops 230*a*, 230*d* in the pair of panels exemplary embodiments are within and connected to sidewalls, respectively, 224*a*, 224*b* and 224*a*, 224*d*, proximate bottom opening like 229 in the exemplary embodiments of FIGS. 1-2A where they do not obstruct passage 225. Adjacent sidewalls include a base 227 having rounded corners 227*a*, 127*d* above respective stops 230*a*, 230*d*.

Cradles 211*a*, 211*c* are formed in the upper sides of opposing sidewalls 224*a* and 224*c* respectively, adjacent sidewall 224*d*. The apparatus shown is suitable as a drop in solution to seal vent passages from storm waters by lowering it into a ventilation shaft to rest on walls of the shaft. In place, a grating (not pictured) covers top opening 226. In normal operation, operator access to the interior of the support box is through the grating.

Referring now to FIGS. 30-31A, a beam 242 comprising extruded tubing unobstructively horizontally spans across passage 225 and connects to opposed sidewalls 224*a*, 224*c* of box 210 adjacent side wall 224*d* and proximate top opening 226. Beam 242 is lodged in cradles 211*a*, 211*c*, and is conveniently lowered into channels 211*a*, 211*c* by operators holding beam foldable handles 212*a*, 212*c*. Beam 242 and straps 244 comprise a suspension member. Beam 242 and its attached equipment can be lowered into place as a complete assembled unit after the support box is installed in ventilation shaft resting on flanges 220. This assembled unit can be removed from the support box for servicing by withdrawing beam 242 from channels 211*a*, 211*c* by means of handles 212*a*, 212*c*.

Figure 30A:
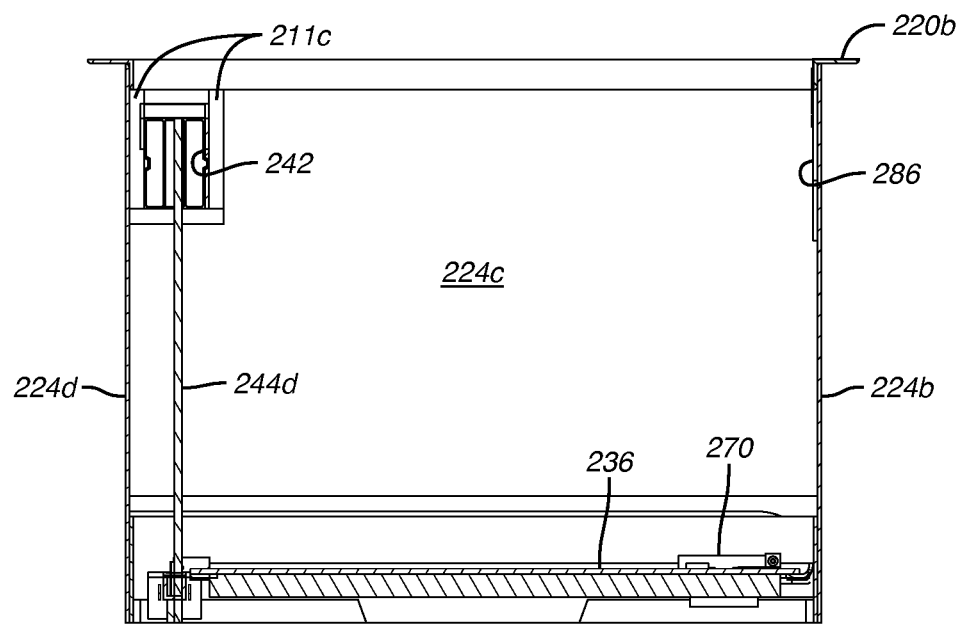
FIG. 30A is a cross sectional view of the embodiment of FIG. 30 taken along the line 30A-30A of FIG. 30.

Referring particularly to FIG. 31A, a hinge mounting member 245 unobstructively horizontally spans across passage 225 the same as beam 242 connected by a plurality of straps 244 to beam 242 (only 244*d* is seen in the sectional views of FIGS. 30A and 31A). Lodged in cradles 211*a* and 211*c*, beam 242 and hinge mounting member 245 spans between sidewalls 224*a*, 224*c* adjacent sidewall 224*d* with beam 242 directly over hinge mounting member 245. Hinge mounting member 245 mounts and supports a plurality of hinge members 243. The hinge members 243, as in the pair of panels exemplary embodiments, each comprise a stationary member 243*b*, a movable member 243*a* and a hinge pin 243*c* that interconnects stationary member 243*b* and movable member 243*a*, stationary member 243*b* connecting to hinge mounting member 245. In FIG. 31A, only moveable member 243*a* is referenced to avoid obfuscation of elements, A single panel 236 having proximal and distal portions, respectively (understood the same as 236*a*, 236*b* in the pair of panels exemplars) are connected at proximal portion 236*a* by moveable hinge members 243*a* to stationary hinge members 243*b* and thereby to a hinge mounting member 245 and from hinge mounting member 245 via straps 244*a*, 244*b*, 244*c* and 244*d* to beam 242, as in the pair of panels exemplars. The connection of moveable hinge members 243*a* to the proximal portion 236*a* of panels 236 on hinge pins 243*c* forms a pivot axis of panels 236 for vertical rotation of panel 236. Panel 236 rotates from or to an upright home position tucked under beam 242. Rotation of panel 236 upwardly (counterclockwise in the exemplary embodiment show) to home position is effected manually as further described below. The home position of panel 236 tucked under beam 242 does not occlude passage 225. Panel 236 in rotation falls solely under the gravitational impetus of its own weight from the upright home position to a lower passage closing position where further rotation is prevented by stops 230*a*, 230*d*. Each panel has a profile that closes the passage when the panels gravitationally rotate to the passage closing position.

In the exemplary embodiment illustrated in FIGS. 30-31A, panel 236 the same as panel 236 in the pair of panels exemplar includes a recess 233' that contains a panel holder latch catch 235'. A panel holder 240 latch 249 for panel 236. Panel holder 240 inclusive of latch 249 is carried by the suspension member 242. Latch 249 is vertically pivotal on a horizontal axis at a proximate end of the latches. The latch axis is parallel to the panel axes of pins 243*c*. Panel holder latch 249, like latch 247 in FIG. 6 pivotally extends externally from the latch axis distally to an inferior return having a sloped surface ending at an inset notch 251'. Recess 233' and latch 249 are horizontally and vertically aligned with each other such that when panel 236 is rotated vertically upward, the inferior return of latch 249 is brought into sliding contact with ramp 241' carried by the panel, and the sloped surface of the latch slides on ramp 241' until inset notch 251' passes over latch catch edge 235', capturing latch 249. This capture holds panel 234, 236 in home position 213. As in the case of the pair of panels exemplar, the placement of the latch and latch catch can be reversed.

As in the case of the pair of panel exemplars, panel holder 240 is movably suspended from suspension member 242 by a rod 246 connected to panel holder 240. Rod 246 is mounted through beam 242 slideably translatable through a brace 255 fastened between straps 244*b*, 244*c* and terminates above beam 242 at T-handle 252 under a cover 253 sheltering T-handle 252 from pedestrian view through a grating covering quadrilateral support 210. Rod 246 and T-handle 252 comprise a panel releaser. The T-handle provides convenient holding, such as by a projection or hook of a reach tool that can be vertically inserted through a small opening in a grating covering support 210 to reach under cover 253 and hook T-handle 252 for lifting panel holder 240. Lifting rod 246 by T-handle 252 moves panel holder 240 upwardly to cause moveable members 247, 249 to lose their hold on catch 241, 241' and release panels 234, 236, allowing panels 234, 236 to rotationally gravitationally fall solely by impetus of their own weight from the upright home position 213 to the lower passage closing position 215.

As shown in FIG. 31, as in the case of the pair of panels exemplars, the single panel exemplary embodiment includes a lift arm 260' having a proximal end 261' pivotally connected by pivot pin 267 to the bottom side of panel 236 on a pivotation axis parallel to the hinge axis 243*c* and a distal end 263', the lift arm 260' being of dimension to contact distal end 263' with opposed lateral sidewall 224*b* when distal end 263' is pivoted upward inside sidewall 224*b* for exertion of lateral force onto connected panel 236 being raised with panel handle 259' to complete rotation of panel 236 into the home position.

As shown in FIGS. 30-31A, the single panel exemplary embodiment includes a drain 270 in panel 236 intermediate the proximate and distal ends thereof.

Having described illustrative examples of embodiments that incorporate concepts of the invention, those skilled in the art will be able to use these concepts as guided by these embodiments, and may form alternative variations that nonetheless embrace the concepts herein disclosed and still be within the scope of my invention as claimed in the claims that follow.

The invention claimed is:

1. Apparatus for allowing ventilation through a vertical ventilation shaft to an underground ventilation duct fluidly communicating through the ventilation shaft to an atmospheric opening of the shaft and on threat of flooding operable to prevent downward flow of surface water into the underground ventilation duct, comprising:
a support comprising opposed lateral sidewalls for arrangement in said shaft defining a passage between top and bottom openings of the support for fluid communication of said ventilation duct up through said support to said atmospheric opening,
one or more panels having proximal and distal ends, a top side, and a bottom side, said proximal end connecting with a horizontal hinge having an axis perpendicular to said opposed lateral sidewalls for rotation of said one or more panels upwardly to an upright home position not obstructing said passage and rotation from said home position downwardly by gravitational impetus of the weight of such panel to reach a lower passage closing position, said one or more panels having a profile that closes said passage when said one or more panels gravitationally rotates to said passage closing position,
a suspension member unobstructively horizontally spanning said passage proximate said top opening, holding said one or more hinge connected panels in said passage and being liftingly removably supported on said opposed lateral sidewalls, and
at least one handle connected to said suspension member for moving said suspension member vertically into or out of said support on said opposed lateral sidewalls.

2. The apparatus of claim 1 in which said support inclusive of said lateral sidewalls is sized to internally fit in said vertical shaft between said ventilation duct and said atmospheric opening, said support further comprising horizontal flanges transverse to said sidewalls for projecting across a top of said shaft to hang said support in said shaft.

3. The apparatus of claim 1 in which said atmospheric opening is cylindrical and said support comprises a hollow cylinder.

4. The apparatus of claim 1 in which said atmospheric opening is rectilinear and said support is quadrilateral.

5. The apparatus of claim 1 in which said suspension member comprises a single unitary vertically extending member.

6. The apparatus of claim 4 wherein said suspension member comprises a beam having vertically hung straps dependent members holding said horizontal hinge and said one or more panels connected with said horizontal hinge.

7. The apparatus of claim 1 further comprising at least one restraint limiting said downward rotation of said one or more panels to said lower passage closing position.

8. The apparatus of claim 7 in which said restraint comprises stops within and connected to said support proximate said bottom opening and not obstructing said passage.

9. The apparatus of claim 1 in which said one or more panels include seals for sealing said passage in said passage closing position.

10. The apparatus of claim 6 in which said one or more panels comprise a pair of panels and wherein said suspension member is liftingly removably supported centrally between said opposed lateral sidewalls for mounting of said panels in said passage for rotation of the panels in directions opposite each other from or to said upright home position not obstructing said passage.

11. The apparatus of claim 10 in which said opposed lateral sidewalls each attach centrally in said passage adjacent said top opening a cradle having a pair of spaced apart parallel vertical arms above a bar for liftingly removably receiving and supporting said suspension member within said vertical arms and on said bar.

12. The apparatus of claim 11 in which said quadrilateral support has at least one indicator on at least one wall adjacent said opposed lateral sidewalls to indicate where at least one structure on a panel of the pair of panels is located below the indicator, and wherein said suspension member has ends each of which bears a key extending laterally past a side of the suspension member, and wherein each said cradle is keyed to receive said key only in one arm of the cradle so Lal said panel of the pair of panels having that at least one structure is located below said indicator.

13. The apparatus of claim 12 in which said suspension member is a beam having vertically hung straps holding said horizontal hinge and said pair of panels is connected with said horizontal hinge, said beam having ends, lateral sides between the beam ends, and a quadrilateral beam end plate attached to each beam end, each said beam end plate having lateral sides extending laterally past said lateral sides of the beam ends, and wherein said cradles each comprise a vertical included right angle between vertical mutually perpendicular projections of said vertical arm, one projection of each vertical arm attaching to one of the opposed sidewalls, the other projection of each vertical arm unattached to said one sidewall, such unattached projections and the included right angles of the vertical arms facing each other and said attached projections being spaced apart sufficiently for vertically receiving said beam end plate within said pair of vertical arms.

14. The apparatus of claim 13 in which one side of said lateral sides of each said beam end plate extends laterally further than the other lateral side of such beam end plate, one unattached projection of one vertical arm of a said cradle has a length longer than the unattached projection of the other vertical arm of that cradle for accepting the lateral side of said beam end plate that extends further than said other lateral side of that beam end plate to receive said beam end plate within said pair of vertical arms.

15. The apparatus of claim 14 wherein said beam end plate and said vertical arms position said beam so a said panel of the pair of panels having that at least one structure is located below said indicator.

16. The apparatus of claim 14 in which said horizontal hinge comprises a hinge mounting member held by said suspension member and a plurality of hinge members mounted on said hinge mounting member, and said hinge mounting member has ends, lateral sides between the hinge mounting member ends, and a quadrilateral hinge mounting member end plate attached to each hinge mounting member end, said hinge mounting member end plates each having lateral sides extending laterally past said lateral sides of said hinge mounting member ends, and wherein said opposing sidewalls each attach a pair of spaced apart horizontal anchor bars centrally in said passage below said cradle and adjacent said bottom opening, each said anchor bar comprising an included right angle between mutually perpendicular horizontal projections of unequal length, the shorter projection of each anchor bar attaching to one of the opposed sidewalls, the longer projection of that anchor bar being unattached to said one sidewall, such unattached projections and the included right angles of the anchor bars facing each other and said attached projections being spaced apart sufficiently to vertically receive said hinge mounting member end plate within said pair of anchor bars.

17. The apparatus of claim 16 wherein said beam end plate, said vertical arms, said hinge mounting member end plate end plate and said anchor bars cooperatively position said beam so a said panel of said pair of panels having that at least one structure is located below said indicator.

18. The apparatus of claim 1 comprising at least one indicator on at least one wall adjacent said opposed lateral sidewalls to indicate where at least one structure on at least one of said panels is located below the indicator.

19. The apparatus of claim 18 wherein said opposing sidewalls each attach in said passage adjacent said top opening a cradle having a pair of spaced apart parallel vertical arms above a bar for liftingly removably receiving and supporting said suspension member within said vertical arms and on said bar.

20. The apparatus of claim 19 in which said suspension member has ends each of which bears a key extending laterally past a side of the suspension member, and wherein each said cradle is keyed to receive said key only in one arm of the cradle so said at least one of said panels having that one or more structures is located below said indicator.

\* \* \* \* \*